US009767359B2

(12) United States Patent
Son et al.

(10) Patent No.: US 9,767,359 B2
(45) Date of Patent: Sep. 19, 2017

(54) METHOD FOR RECOGNIZING A SPECIFIC OBJECT INSIDE AN IMAGE AND ELECTRONIC DEVICE THEREOF

(71) Applicant: Samsung Electronics Co., Ltd., Gyeonggi-do (KR)

(72) Inventors: Dong-Il Son, Gyeonggi-do (KR); Cheol-Ho Cheong, Seoul (KR)

(73) Assignee: Samsung Electronics Co., Ltd (KR)

( * ) Notice: Subject to any disclaimer, the term of this patent is extended or adjusted under 35 U.S.C. 154(b) by 102 days.

(21) Appl. No.: 14/551,861

(22) Filed: Nov. 24, 2014

(65) Prior Publication Data
US 2015/0146925 A1 May 28, 2015

(30) Foreign Application Priority Data

Nov. 22, 2013 (KR) .................. 10-2013-0143096

(51) Int. Cl.
*G06K 9/00* (2006.01)
*G06F 3/01* (2006.01)
*G06K 9/20* (2006.01)
*G06K 9/22* (2006.01)

(52) U.S. Cl.
CPC ......... *G06K 9/00624* (2013.01); *G06F 3/017* (2013.01); *G06K 9/2081* (2013.01); *G06K 9/22* (2013.01)

(58) Field of Classification Search
CPC combination set(s) only.
See application file for complete search history.

(56) References Cited

U.S. PATENT DOCUMENTS

| | | | |
|---|---|---|---|
| 8,144,990 B2 | 3/2012 | Englund et al. | |
| 8,154,428 B2 * | 4/2012 | Do | G06F 3/0425 340/5.8 |
| 8,161,415 B2 * | 4/2012 | Borgaonkar | G06F 3/04883 715/816 |
| 8,379,134 B2 * | 2/2013 | Foster | H04N 5/232 250/330 |
| 8,842,919 B2 * | 9/2014 | Katz | G06F 3/017 382/203 |
| 9,075,520 B2 * | 7/2015 | Park | G06K 9/00704 |
| 9,158,409 B2 * | 10/2015 | Lv | G06F 3/0416 |
| 9,607,010 B1 * | 3/2017 | Tompkins | G06F 17/30259 |
| 2003/0016253 A1 * | 1/2003 | Aoki | G06F 1/1626 715/863 |
| 2003/0048280 A1 * | 3/2003 | Russell | G06F 3/017 345/619 |
| 2009/0138830 A1 * | 5/2009 | Borgaonkar | G06F 3/04883 715/863 |
| 2009/0198354 A1 * | 8/2009 | Wilson | G06F 3/0346 700/90 |
| 2009/0228841 A1 * | 9/2009 | Hildreth | G06F 3/0304 715/863 |

(Continued)

*Primary Examiner* — Anand Bhatnagar
(74) *Attorney, Agent, or Firm* — The Farrell Law Firm, P.C.

(57) ABSTRACT

A method and an apparatus for recognizing a specific object inside an image in an electronic device are provided. The method includes displaying at least one image; detecting at least one gesture; selecting a recognition function related to at least one object existing in the at least one image according to the detected at least one gesture; and recognizing the at least one object using the selected recognition function.

28 Claims, 20 Drawing Sheets

(56) References Cited

U.S. PATENT DOCUMENTS

| | | | |
|---|---|---|---|
| 2010/0020221 A1* | 1/2010 | Tupman | G06F 3/04883 348/333.01 |
| 2010/0166339 A1* | 7/2010 | Gokturk | G06F 17/30256 382/305 |
| 2011/0123115 A1 | 5/2011 | Lee et al. | |
| 2012/0176401 A1* | 7/2012 | Hayward | H04N 5/23216 345/619 |
| 2013/0191768 A1* | 7/2013 | Thompson | G06F 3/04883 715/765 |
| 2014/0123077 A1* | 5/2014 | Kutliroff | G06F 3/017 715/863 |
| 2014/0198129 A1* | 7/2014 | Liu | G06F 3/04815 345/633 |

\* cited by examiner

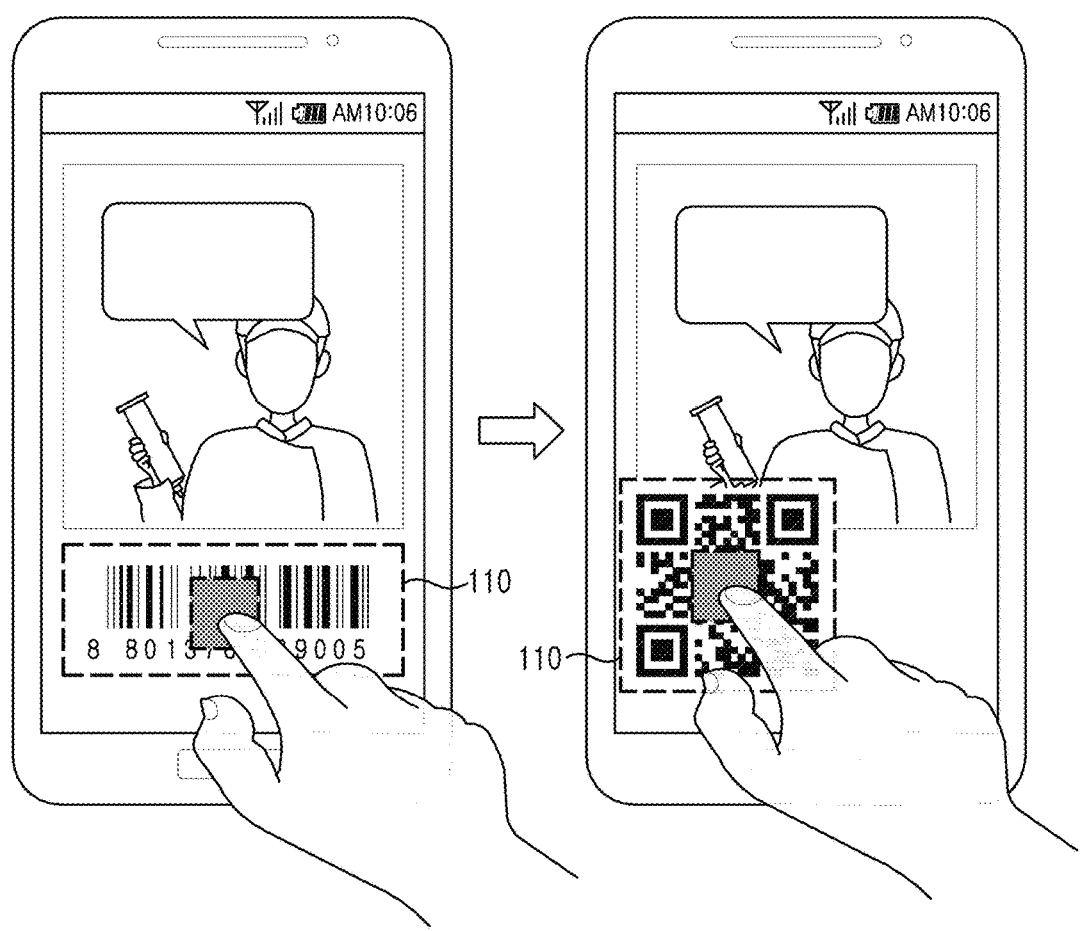

Data Matrix

QR Code

PDF417

Code 49

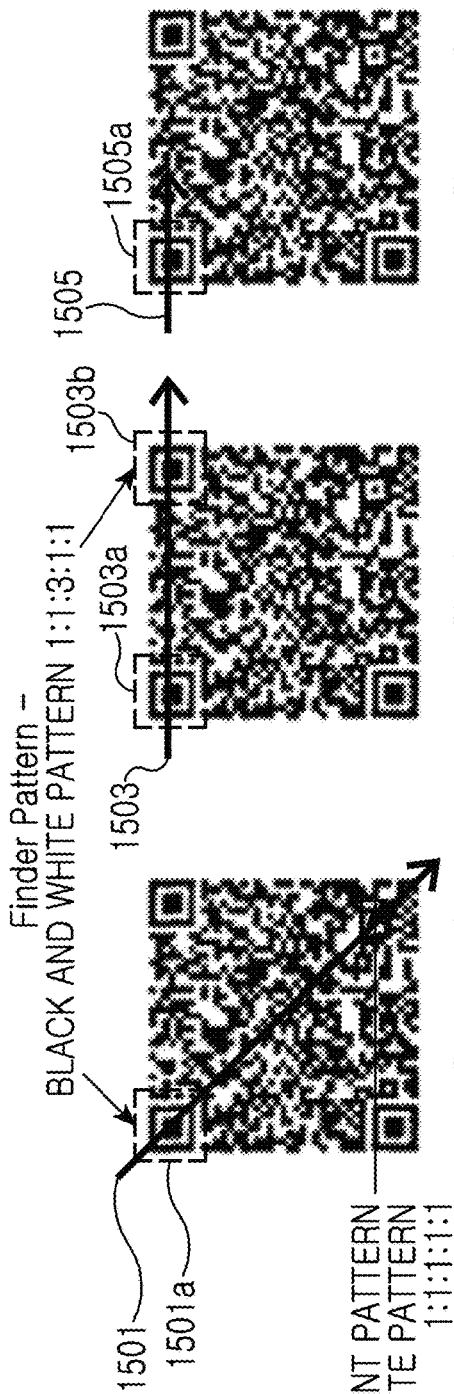
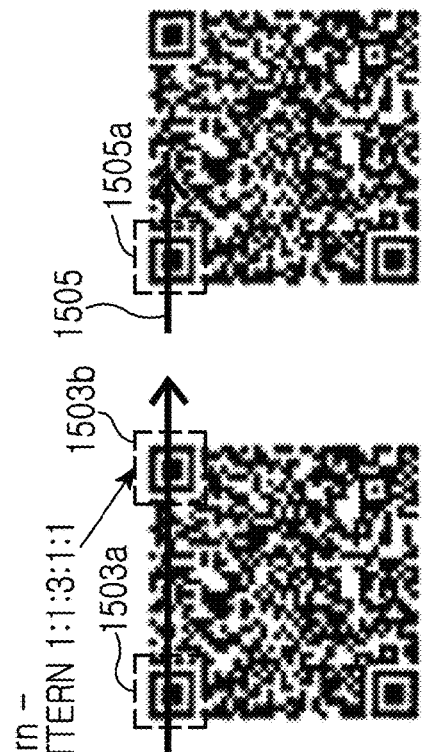
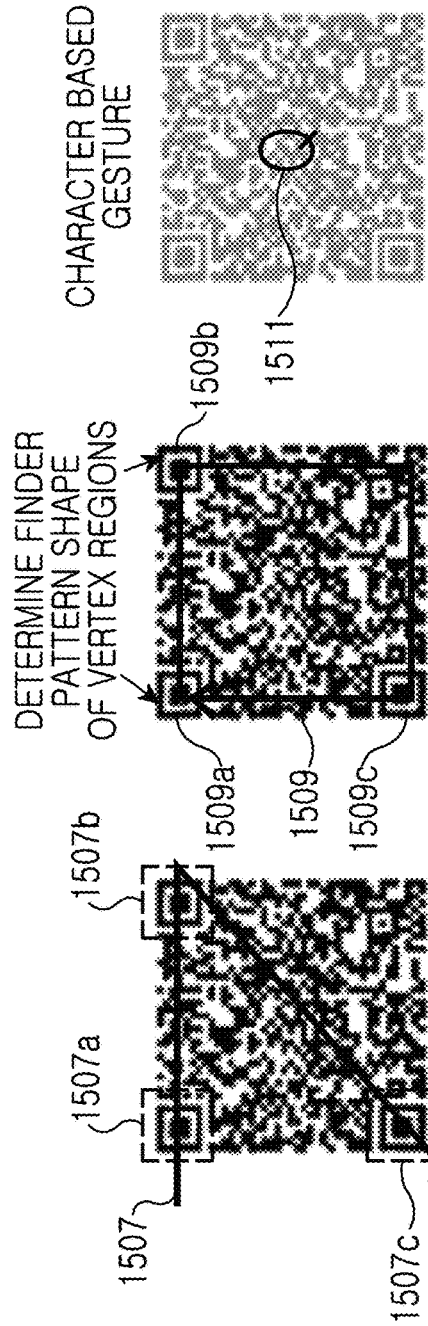
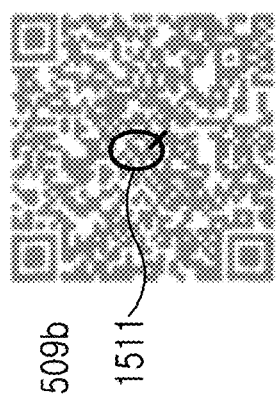
FIG.15A — ALIGNMENT PATTERN BLACK AND WHITE PATTERN 1:1:1:1:1
FIG.15B — Finder Pattern – BLACK AND WHITE PATTERN 1:1:3:1:1
FIG.15C
FIG.15D
FIG.15E — DETERMINE FINDER PATTERN SHAPE OF VERTEX REGIONS
FIG.15F — CHARACTER BASED GESTURE

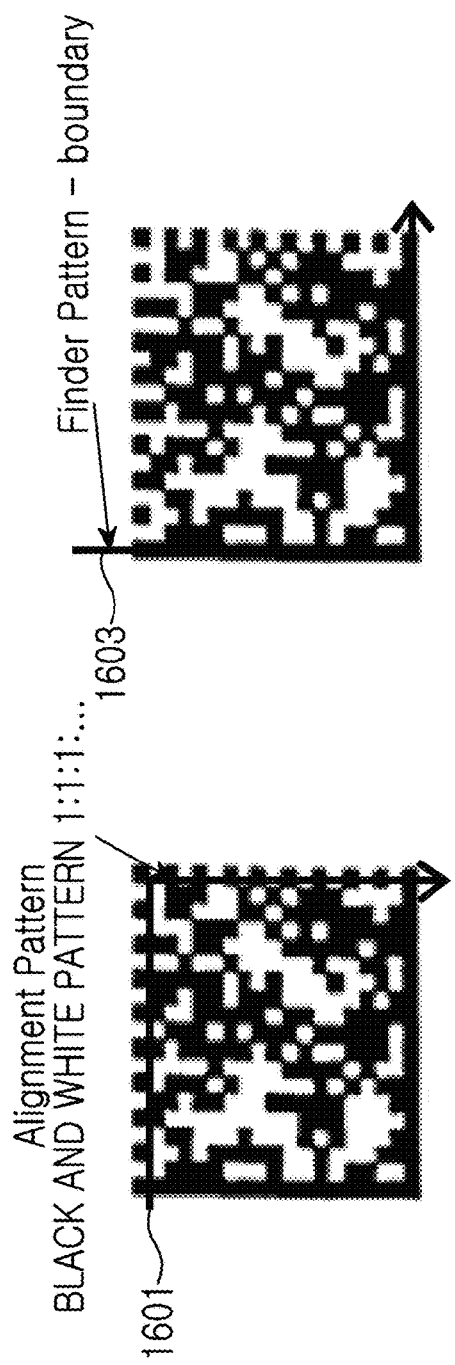
FIG.16A
FIG.16B
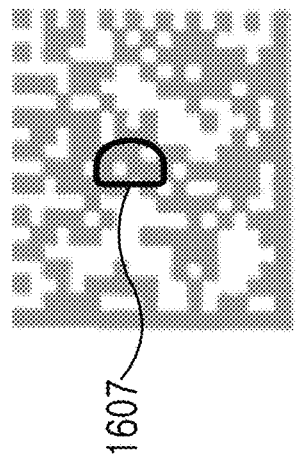
FIG.16C
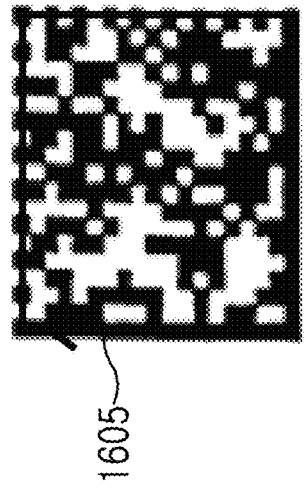
FIG.16D

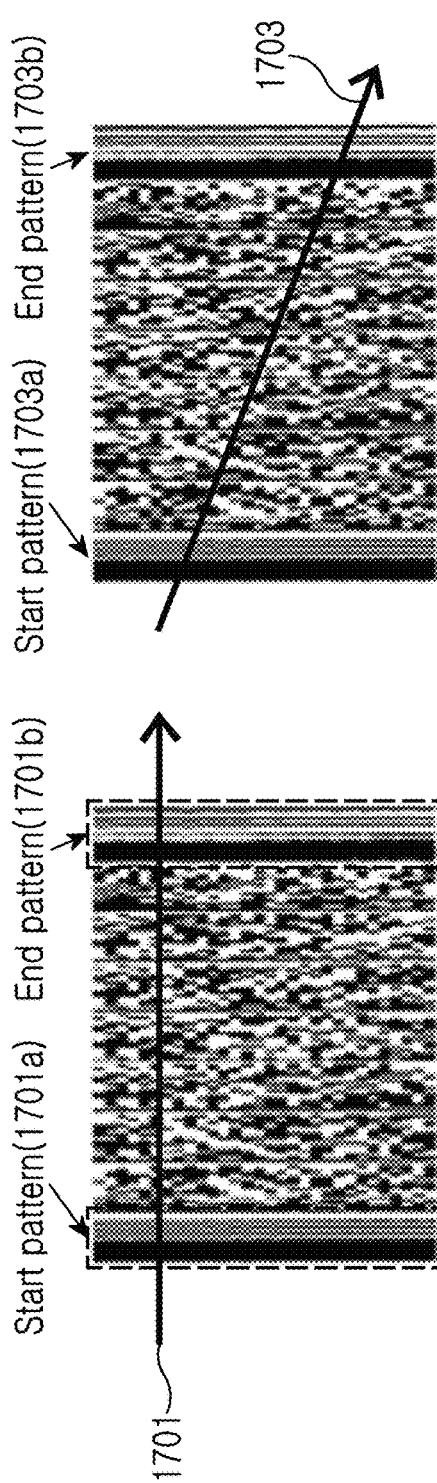
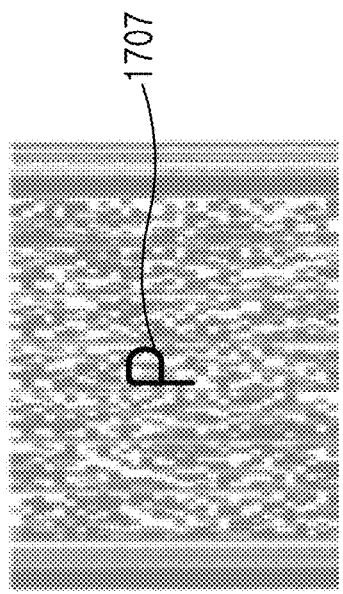
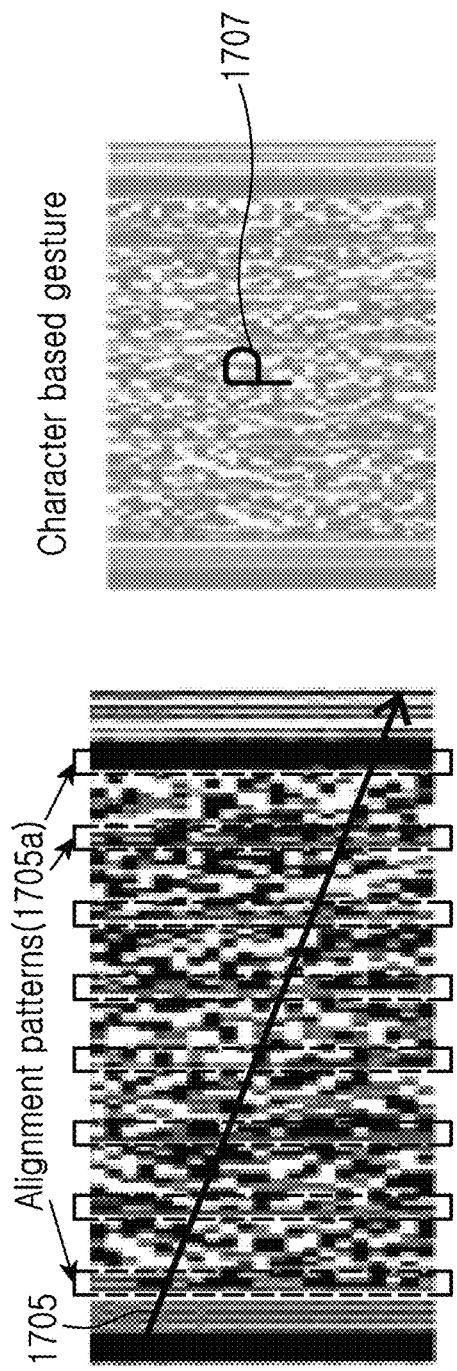
FIG.17A
FIG.17B
FIG.17C
FIG.17D

METHOD FOR RECOGNIZING A SPECIFIC OBJECT INSIDE AN IMAGE AND ELECTRONIC DEVICE THEREOF

PRIORITY

This application claims priority under 35 U.S.C. §119(a) to a Korean Patent Application Serial No. 10-2013-0143096, filed in the Korean Intellectual Property Office on Nov. 22, 2013 the entire content of which is incorporated herein by reference.

BACKGROUND OF THE INVENTION

1. Field of the Invention

The present invention relates generally to image recognition, and more specifically, to a method and an apparatus for recognizing a specific object inside an image in an electronic device.

2. Description of the Related Art

A conventional touchscreen interface can be used to provide a basic function related to image shooting performed by a camera via a Graphic User Interface (GUI). For example, to use a photo shooting mode, a video shooting mode, a panoramic image shooting mode, etc., a user may tap or touch one or more icons representing a shooting mode, a specific icon, or a specific item in a list, in order to select and operate the shooting mode. This method is used for selecting a shooting mode of a camera, or for selecting a basic function for shooting. A user may also drive other functions via a touchscreen interface. For example, a user may use the touchscreen interface to operate a function for reading specific information existing on an object during an image capture preview state via an image sensor mounted on an electronic device, such as a portable terminal and a smartphone.

Recently, various recognition technologies that use a camera, for example, applications technologies that use a barcode, a two-dimensional code, a color-based code, business card recognition, face recognition, etc., are distributed across separate applications or recognition modules within applications. Generally, a touchscreen interface is used to drive separate applications depending on a type of an object to be recognized, or to select a kind of a specific recognition module from within a same application.

An application for recognizing a business card, a barcode, or a Quick Response (QR) code in an electronic device may obtain an image corresponding to a specific business card, a barcode, and a QR code via an image sensor, and then extract a barcode and a QR code inside a relevant image to display information included in the extracted code.

SUMMARY OF THE INVENTION

A method of extracting and recognizing a region of an object from a whole image obtained via an image sensor consumes a great amount of time and requires a significant amount of operations. Further, there is a great possibility of extracting erroneous regions. Therefore, to increase a recognition rate and an image process efficiency, a recognition region may be generated such that recognition may be performed within only a predetermined limited region of an image, and a range of a relevant recognition region may be displayed on a display. As an example of this method, a relevant application displays a preview image obtained in real-time via a camera sensor, and displays a range of a predetermined fixed region to recognize in a user interface of a rectangular shape or square shape.

As another example, a method of adjusting a size and a position of a specific region to recognize via a touchscreen interface in a shot (i.e., captured) photo image may be provided. Generally, such methods are used exclusively by an application for recognizing a business card, a barcode, and a QR code, and exist separately from a general camera shooting application in many cases. Further, a user must manually drive a separate application to perform these functions, and since a menu or an icon, etc. exist separately, it is inconvenient to find and execute a relevant application.

As another example, a method may be implemented to add a separate menu or icon, etc. for selecting a relevant recognition module inside a camera app. Even in this case, since a user must pass through many sub menu paths in order to select a relevant menu or icon, these operations are inconvenient.

To address at least the above-mentioned problems and/or disadvantages and to provide at least the advantages described below, an aspect of the present invention is to provide a method and an apparatus for recognizing a specific object inside an image in an electronic device.

Another aspect of the present invention is to provide a method and an apparatus for analyzing an image obtained via an image sensor in order to obtain information and executing an object recognition module suitable for the information in addition to a basic function of the image sensor in an electronic device.

Still another aspect of the present invention is to provide an apparatus and a method for allowing a user to recognize a desired object fast and conveniently by determining a region and a kind of an object to recognize and recognizing the object via a user gesture that uses the user's finger, a stylus pen, or a pointing device when an image obtained via an image sensor is displayed in an electronic device.

In accordance with an aspect of the present invention, a method for recognizing a specific object inside an image in an electronic device is provided. The method includes displaying at least one image; detecting at least one gesture; selecting a recognition function related to at least one object existing in the at least one image according to the detected at least one gesture; and recognizing the at least one object using the selected recognition function.

In accordance with another aspect of the present invention, an electronic device is provided. The electronic device includes at least one processor; and at least one memory, wherein the processor comprises instructions configured to display at least one image, detect at least one gesture, select a recognition function related to at least one object existing in the at least one image according to the detected at least one gesture, and recognize the at least one object using the selected recognition function.

BRIEF DESCRIPTION OF THE DRAWINGS

The above and other aspects, features and advantages of certain embodiments of the present invention will become apparent from the following description taken in conjunction with the accompanying drawings in which:

FIGS. 1A and 1B are diagrams illustrating a user interface for selecting a recognition region from an image according to various embodiments of the present invention;

FIGS. 15A, 15B, 15C, 15D, 15E and 15F are diagrams illustrating examples of recognition of a QR code based on a user's gesture according to various embodiments of the present invention;

FIGS. 16A, 16B, 16C and 16D is a diagram illustrating examples of recognition of a data matrix based on a user's gesture according to various embodiments of the present invention;

FIGS. 17A, 17B, 17C and 17D are diagrams illustrating examples of recognition of a PDF417 or a barcode based on a user's gesture according to various embodiments of the present invention;

DETAILED DESCRIPTION OF EMBODIMENTS OF THE PRESENT INVENTION

Figures 2A, 2B:
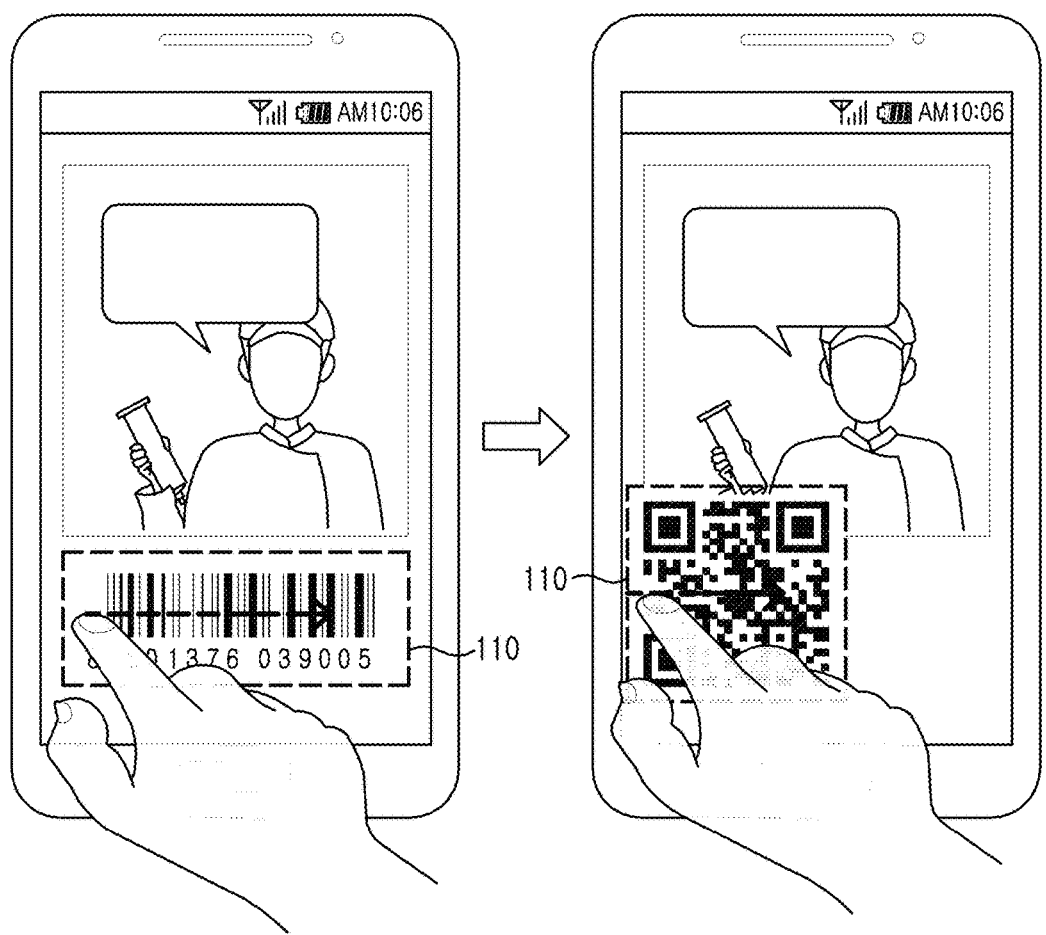
FIGS. 2A and 2B are diagrams illustrating a user interface for driving a recognition module for analyzing image content inside a selected recognition region according to various embodiments of the present invention.

The following description with reference to the accompanying drawings is provided to assist in a comprehensive understanding of embodiments of the present invention as defined by the appended claims and their equivalents. The following description includes various specific details to assist in understanding the understanding the present invention, but these specific details are to be regarded as mere examples. Accordingly, various changes and modifications of the embodiments of the present invention described herein can be made without departing from the scope and spirit of the invention. Also, descriptions of well-known functions and constructions may be omitted for clarity and conciseness. The terms and words used in the following description are terms defined with consideration functions with respect to embodiments of the present invention and may vary depending on an intention or practice, etc. of a user and an operator. Therefore, definitions of terms and words used herein should be made based on content throughout the specification. Throughout the drawings, like reference numerals may be used to refer to like parts, components and structures.

When a plurality of recognition objects exist or a plurality of kinds of objects exist in an obtained image, a user is inconveniently required to adjust a camera pose or zoom, etc., in order to recognize an object and designate a recognition region in a shot image. Particularly, when recognizing a plurality of recognition objects corresponding to different respective types of recognition modules, a user must sequentially drive a plurality of recognition modules or designate a recognition module kind via a user interface in order to process this information, and therefore, an amount of operations may increase or real-time recognition may be difficult to perform.

Hereinafter, a method and an apparatus for recognizing image content in an electronic device according to various embodiments of the present invention are described.

FIGS. 1A and 1B are diagrams illustrating a user interface for selecting a recognition region from an image according to various embodiments of the present invention.

Referring to FIGS. 1A and 1B, a barcode region or a QR code region in an image, as shown in FIGS. 1A and 1B, respectively, may be touched and selected by a user. For example, an object most adjacent to a touched position or an object including a portion of at least a touched position may be selected. According to an embodiment of the present invention, a quadrangular box 110 is activated and displayed around a selected object, and a size of the quadrangular box may be further adjusted by a user. The quadrangular box 110 indicating that an object has been selected is one example. According to various embodiments, the indication is not limited to the quadrangular box but may be represented in figures of various shapes. The image may be a preview screen obtained via an image sensor or an image (or a moving picture, and a photo) stored in a memory in advance.

According to various embodiments of the present invention, an object region may be selected using an input such as hovering, dragging, sweeping, etc., instead of a touch input or a tap input.

According to another embodiment of the present invention (not shown), when using a Head Mounted Display (HMD) mounted onto a camera thereon or a see-through-type eye glass, an image input via an image-pickup device is displayed via a display mounted in front of a user's eyes, selection of an object may be determined using a gesture or movement of a hand or a finger, in place of input using a touch device. For this purpose, the camera or a separate camera or a gyro sensor, an acceleration sensor, etc. mounted on a hand may be used to detect a gesture of a finger or a hand, and a corresponding object region is selected depending on the relevant gesture. For example, when a gesture of a finger positioned between a relevant object and an HMD occurs on a specific object, a gesture and a position of a finger may be determined via a camera. Also, a region of a specific object existing at a relevant position may be recognized. When a user indicates a certain object with his finger and then makes a circle gesture or shakes his finger up and down, the user may designate a region of an object having at least a minimal portion thereof positioned in the relevant region. Alternatively, when a user indicates a specific object with an end of his finger and maintains the gesture for a predetermined time, the electronic device may perform an operation of recognizing an object positioned in an end direction of his finger or neighboring his finger, or an object whose region partially overlaps minimally, and selecting a region of this object.

At this point, the specific object and the finger do not necessarily need to physically come into contact with each other. Instead, a nearest object image indicated by an image of an end of a finger, or a finger image that contacts or hides (i.e., obscures) a minimal partial region of a relevant object image, may be used to determine the relevant object.

However, when an object image is hidden, a region of a relevant object image may be determined by storing an input image in advance before the object is hidden, and recovering the relevant object image on a memory from the stored input image. For another example, when a relevant gesture occurs, the electronic device may recognize that the gesture is an object select operation, and when the gesture ends and an image of a finger or a hand leaves a relevant object region, the electronic device is able to determine an object region.

When this object region is selected, the electronic device informs a user that the relevant object region has been selected, by using, for example, graphics, a sound, voice, and a haptic feedback.

FIGS. 2A and 2B are diagrams illustrating a user interface for driving a recognition module for analyzing an object inside a selected recognition region according to various embodiments of the present invention. Here, the recognition module recognizes an object such as a barcode, a QR code, and a character. The recognition module may be implemented using software or hardware. Hereinafter, the recognition module is referred to as an object recognition module. Herein, the term "a character" may refer to an individual character or a grouping of a plurality of characters, such as a character string.

Referring to FIGS. 2A and 2B, examples of driving an object recognition module for analyzing a barcode region or a QR code region selected in FIGS. 1A and 1B, respectively, are illustrated.

For example, after a barcode region is selected by a user touch input in FIG. 1A, when a user gesture (e.g., a swipe operation) of dragging from the left to the right after a touch is detected, a relevant object recognition module (or a barcode recognition module) is driven and a barcode is recognized.

Although a swipe operation is referred to as an example of a user gesture, embodiments of the present invention are not limited to this gesture, and other user gestures may be defined, such as by a user configuration, in accordance with embodiments of the present invention.

A plurality of user gestures are mapped to a plurality of different respective object recognition modules, so that an object recognition module corresponding to a user gesture may be immediately executed.

According to other various embodiments of the present invention, a user gesture is used as an instruction for driving an object recognition module. Regarding an object recognition module to be used, after an type of object is automatically analyzed and a relevant object recognition module is selected, the relevant object recognition module is driven, as described further herein with reference to FIGS. 15 to 17.

Generally, when using a barcode, a business card, two-dimensional code recognition, etc., since recognition performance may be influenced depending on definition of an image, when a user gesture is recognized with a selected object region mainly focused, an improved recognition rate is expected. Herein, the term focus refers to placing a focus on an object or an object region, such as indicated by the dashed lines surrounding the barcode in FIG. 1A or the focus surrounding the QR code in FIG. 1B, for example. The term "mainly focused" refers to an object or an object region having a primary focus within an image. Therefore, when an object region is selected, a simultaneously selected object is mainly focused and object recognition may be performed. According to various embodiments of the present invention, when a specific region is focused automatically or manually, a region for receiving a user gesture is generated inside a predetermined region from within the focused portion, and when a predetermined user gesture for recognizing a barcode is input in a region including a portion of a minimum relevant region, the barcode or a QR code is recognized and a predetermined relation function is performed.

Figures 3A, 3B:
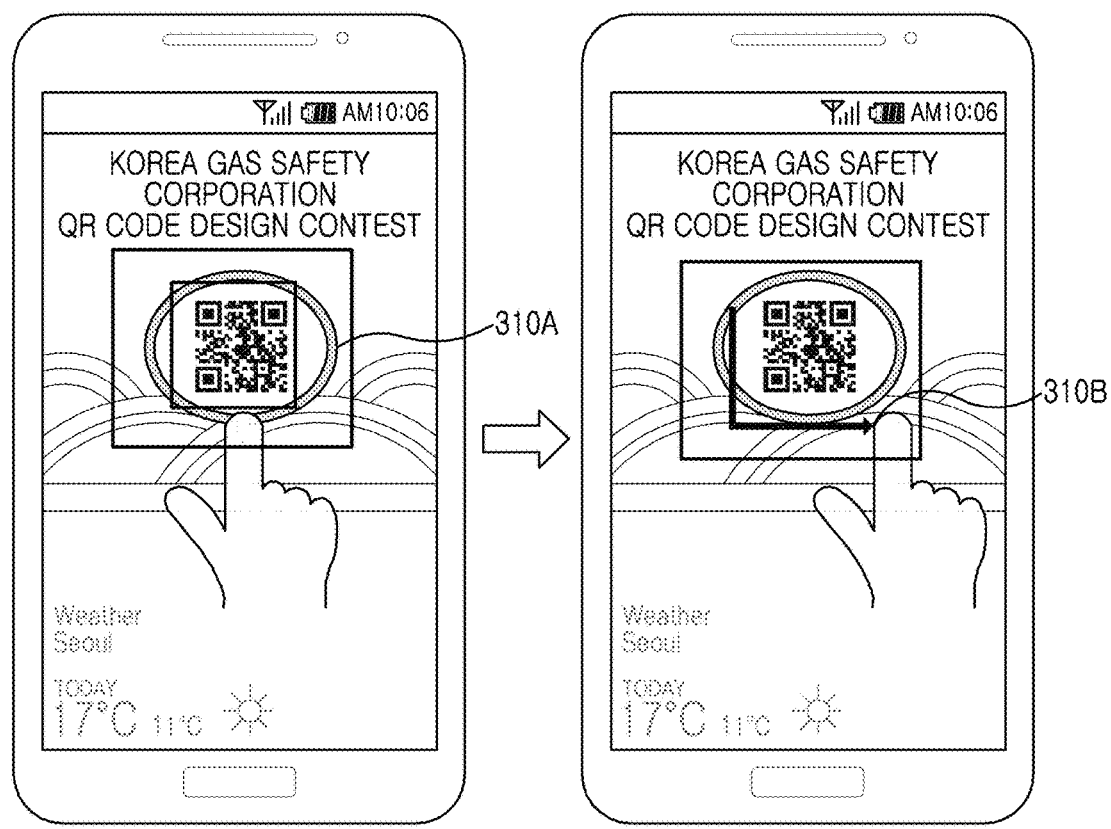
FIGS. 3A and 3B are diagrams illustrating a user interface for driving a recognition module for selecting a recognition region during a preview state and analyzing image content inside the selected recognition region according to various embodiments of the present invention.

FIGS. 3A and 3B are diagrams illustrating a user interface for driving a recognition module for selecting a recognition region during a preview state and analyzing image content inside the selected recognition region according to various embodiments of the present invention.

Referring to FIG. 3A, a QR code region is selected, by a user touch, from an image obtained via an image sensor. At this point, a QR code region is mainly focused.

According to various embodiments of the present invention, a QR code is automatically selected from an image obtained by an image sensor and focused. Accordingly, an object region including a QR code is set during a preview state without a user touch input.

Referring to FIG. 3B, in response to receipt of a user gesture of dragging a touch in an L shape in a selected QR code region inside an image, a recognition module for recognizing the QR code may be driven. Accordingly, the user gesture of the L shape indicates a request to drive a QR code recognition module.

Here, a QR code recognition module is mapped to the user gesture, so that when the user gesture is input, the QR code recognition module is immediately driven.

According to various embodiments of the present invention, a type of object inside a selected object region is determined and a determined object recognition module is driven according to an input user gesture.

Figures 4A, 4B:
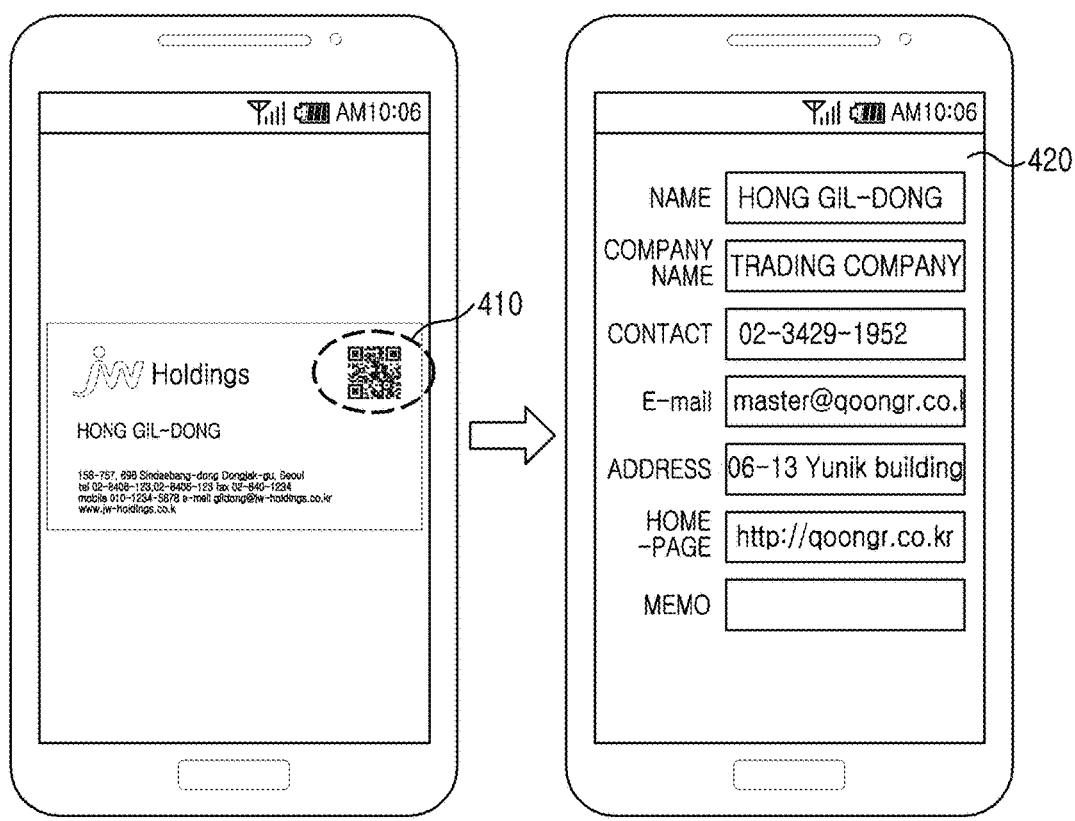
FIGS. 4A and 4B are diagrams illustrating an example of recognizing a QR code inside a business card and providing information corresponding to the QR code according to various embodiments of the present invention.

FIGS. 4A and 4B are diagrams illustrating an example of recognizing a QR code inside a business card and providing information corresponding to the QR code according to various embodiments of the present invention.

Referring to FIG. 4A, a business card is previewed on a display via an image sensor, and an object region is designated, so that a QR code is recognized as described herein with reference to FIGS. 1A to 3B.

Referring to FIG. 4B, when a QR code existing on the business card of FIG. 4A is recognized, information included in the QR code is extracted and provided to a display. For example, information such as a name, a company name, contact information, an e-mail, an address, a home page, etc., are displayed.

Figure 5:
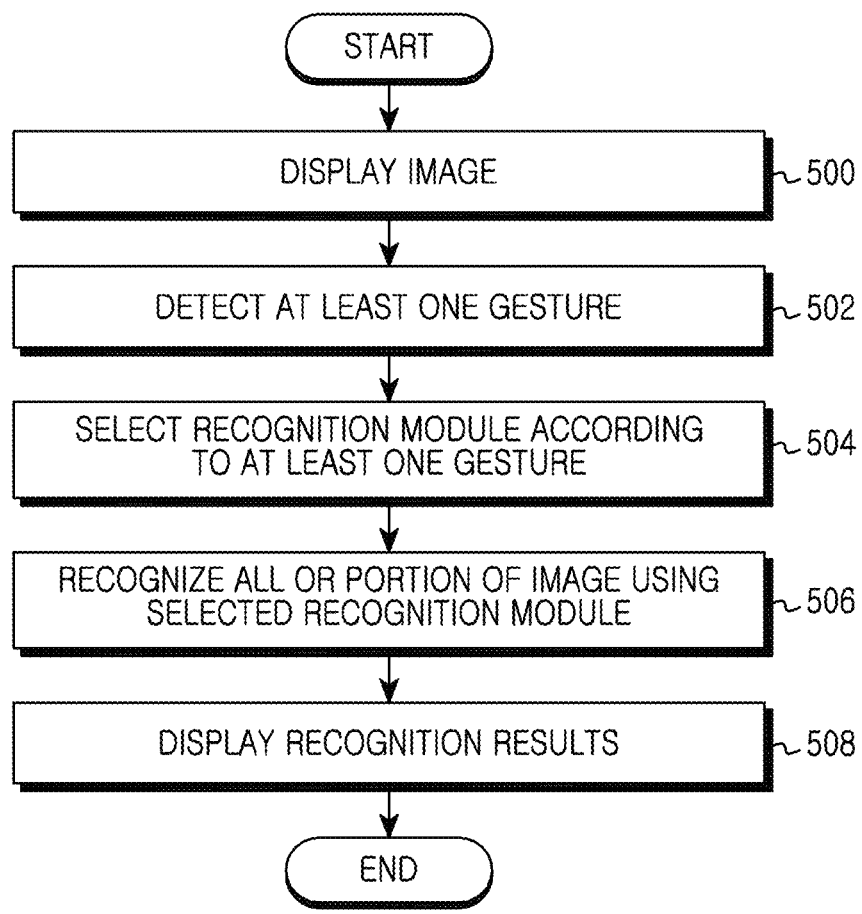
FIG. 5 is a flowchart illustrating a method for recognizing image content in an electronic device according to various embodiments of the present invention.

FIG. 5 is a flowchart illustrating a method for recognizing image content in an electronic device according to various embodiments of the present invention.

Referring to FIG. 5, an electronic device may display an image via a display, in step 500. The image is an image obtained via an image sensor that is previewed to the user and then provided to the electronic device, or may be a photo or a moving picture stored in a memory in advance.

The electronic device detects at least one user gesture, in step 502.

For example, a partial region in the image may be designated as an object region via a first user gesture, and an object recognition module for analyzing the designated object region may be selected via a second user gesture. For example, the first user gesture is a touch neighboring the object region or a touch detected within the object region, and the second user gesture may be mapped to a relevant object recognition module and may be defined by a user touch pattern input.

According to various embodiments of the present invention, an object region is automatically designated without the first user gesture. For example, an object region may be automatically designated using the shape, size, position, color, a pattern density, etc. of an object as a reference.

According to various embodiments of the present invention, the second user gesture is used simply as an instruction for indicating driving of an object recognition module, and in this case, the electronic device determines a kind of an object of the designated object region using a predetermined reference.

According to various embodiments of the present invention, object region designation and an object recognition module are determined via a single user gesture. For example, when a user gesture of a quadrangular shape is input for the center of an object region, a size of the quadrangle becomes an object region and represents a first object recognition module. When a user gesture of a circular shape is input for the center of an object region, circle becomes an object region and represents a second object recognition module.

According to various embodiments of the present invention, the electronic device additionally performs an operation of improving an image quality of an image using the designated object region as a reference. For example, when the image is a preview image, the designated object region is mainly focused and accordingly, a new image having an improved image quality is obtained. Alternatively, image quality may be improved using brightness, definition, contrast, or an exposure of an image as a reference.

The electronic device selects an object recognition module according to at least one user gesture, in step 504, analyzes a designated object region inside the image using the selected object recognition module, in step 506, and displays an analysis result, in step 508.

According to various embodiments of the present invention, the electronic device displays at least one recommended object recognition module before analyzing a designated object region inside the image.

According to other various embodiments of the present invention, a wearable display device such as an HMD, an eye glass, etc. is used in implementing the above-described embodiments of the present invention by recognizing a user's input using a gesture detect device mounted on a camera, a hand, or a finger.

Figure 6:
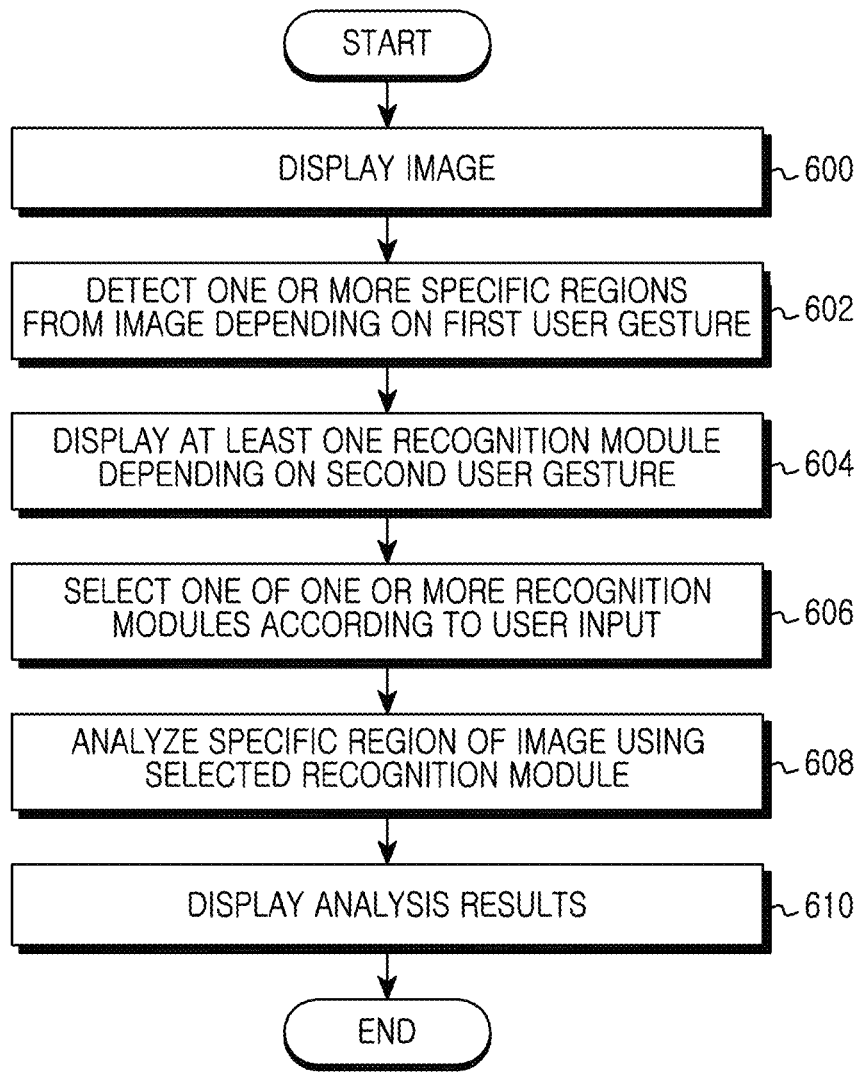
FIG. 6 is a flowchart illustrating a method for recognizing image content in an electronic device according to various embodiments of the present invention.

FIG. 6 is a flowchart illustrating a method for recognizing image content in an electronic device according to various embodiments of the present invention.

Referring to FIG. 6, the electronic device displays an image via a display, in step 600. The image may be obtained via an image sensor that is previewed to a user and then provided to the electronic device, or may be a photo or a moving picture stored in a memory in advance.

The electronic device designates at least one object region in the image, in step 602.

For example, a boundary or a range of the object region in the image may be automatically designated by a predetermined reference. Here, the predetermined reference may be based on at least one of a size, a position, and a pattern density of at least one object in the image. Also, the predetermined reference may be recognition of an object in the foreground of an image closest to an image-pickup device or a largest object, and an object region (i.e., a region corresponding to an object) is mainly focused.

When a plurality of object regions are recognized in an image, each of the object regions may be focused according to a predetermined time interval.

According to various embodiments of the present invention, an object region in an image may be designated by a user input (or a first user gesture). For example, the object region may be designated as a region of an object closest to a touched position or a region of an object including at least a minimal portion thereof positioned at or near a touched position.

According to various embodiments of the present invention, the electronic device may additionally improve an image quality of an image using the designated object region as a reference. For example, when the image is a preview image, the designated object region is mainly focused and accordingly, a new image having an improved image quality is obtained. Alternatively, image quality may be improved using brightness, definition, contrast, or an exposure of an image as a reference.

The electronic device displays a second user gesture input signal within a selected object region of the image to display at least one related object recognition module, in step 604.

For example, the electronic device may detect a user gesture pattern (e.g., a swipe operation, an L-shaped touch input, etc.) to display at least one object recognition module list mapped to the detected user gesture pattern.

For this purpose, the electronic device may calculate a coincidence rate between pattern information of an input user gesture and pattern information of a user gesture stored in advance, and determine at least one object recognition module (e.g., a character recognition module, a barcode recognition module, a face recognition module, etc.) related to at least one candidate pattern whose coincidence rate is at least a predetermined value.

According to other various embodiments of the present invention, the electronic device determines a type of the object region according to the second user gesture input signal, to determine an object recognition module according to an object type.

The electronic device selects one of at least one recognition module according to a user input, in step 606.

The electronic device analyzes an object region of the image using the selected object recognition module, in step 608, and displays the analysis results, in step 610.

According to various embodiments of the present invention, when a plurality of detected object regions exist, the same operations (i.e., step 602 to step 610) may be performed on objects of relevant object regions by one second user gesture.

According to other various embodiments of the present invention, the second user gesture is detected in regions other than the detected object region. For example, when at least one detected object region exists, and all other relevant object regions are barcodes, when a user gesture input in other regions except the detected object region corresponds to a barcode recognition instruction, a decoding instruction for barcodes of the detected object regions is performed and results thereof are displayed on a display.

According to other various embodiments of the present invention, without displaying at least one related object recognition module list and selecting one object recognition module from the object recognition module list, a related object recognition module is immediately driven according to the second user gesture, and the detected object region is analyzed.

Although an object region is designated by the first user gesture and an object recognition module for recognizing the object region is selected and driven by the second user gesture in the examples according to FIG. 6, object region designation and object recognition module selection may be performed via a single user gesture. More specifically, when a user gesture input signal is input, the object region may be designated based on a position of an image where a user gesture input signal has occurred, and a type of the object region may be determined, so that an object recognition module corresponding to the result thereof may be selected and driven.

Figures 7A, 7B:
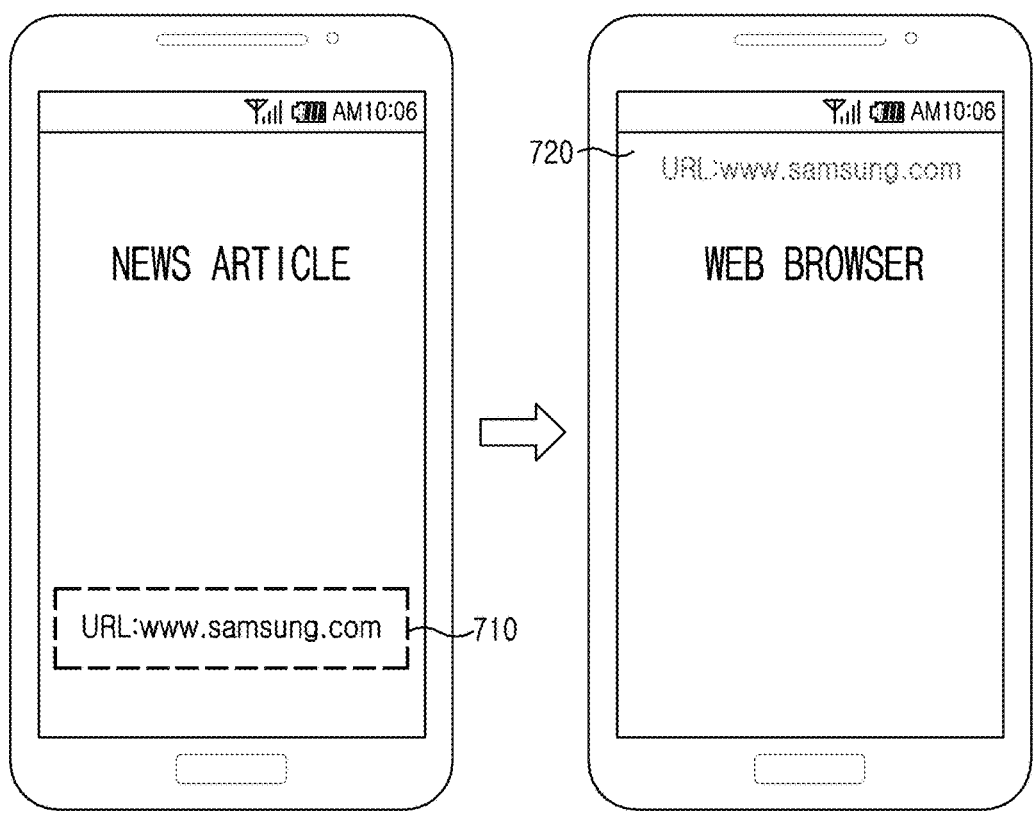
FIGS. 7A and 7B are diagrams illustrating an example of recognizing a specific Uniform Resource Locator (URL) address inside a news article and entering a site corresponding to the URL via a web browser according to various embodiments of the present invention.

FIGS. 7A and 7B are diagrams illustrating an example of recognizing a specific Uniform Resource Locator (URL) address inside a news article and entering a site corresponding to the URL via a web browser according to various embodiments of the present invention.

According to other various embodiments of the present invention, various user interfaces related to a designated object recognition module may be provided. More specifically, when an object designated by a user gesture is recognized, or when a pattern of a user gesture is recognized, various services may be provided in relation to analysis results.

For example, as in FIGS. 7A and 7B, when an advertisement exists in a periodical, such as a newspaper and a magazine, when a Uniform Resource Locator (URL) address exists in content of the advertisement, this information may be displayed through various methods. A relevant URL may be displayed in simple text, and a complicated URL may be provided in the form of a QR code or a barcode. When an object displayed using a two-dimensional image code, etc. such as a character, a barcode, etc. is obtained via an image sensor and an object recognition module is designated via a user gesture, an object is not merely recognized, but various related applications may be provided.

For example, when information in the form of a URL from a relevant object is decoded, a browser may be driven. When it is determined that information, such as a phone number, an address, etc., is included in a decoded relevant object, a related application, such as a telephone application or a mail write application may be driven, or a user may be provided with an option to select a relevant application via a user interface. At least one information type is included in a designated or recognized object, and one or more related applications may be designated or driven.

Generally, after an object recognition module is driven and information is recognized, a user interface may be displayed on a display so that a user is able to drive or select a related application, but an object recognition module may not necessarily operate. Even when an object recognition module is designated by a user gesture, at least one related applications is provided even when an object recognition module does not operate. For example, URL information corresponding to character information may be used when a user accesses a site via a web browser, but may alternatively be used as information for simply copying the URL information in a memory and then pasting the same URL information into a different application. Therefore, an object is recognized as a character, an operation of driving a character recognition module may be performed after a related application is executed or an application list is displayed.

Figure 8:
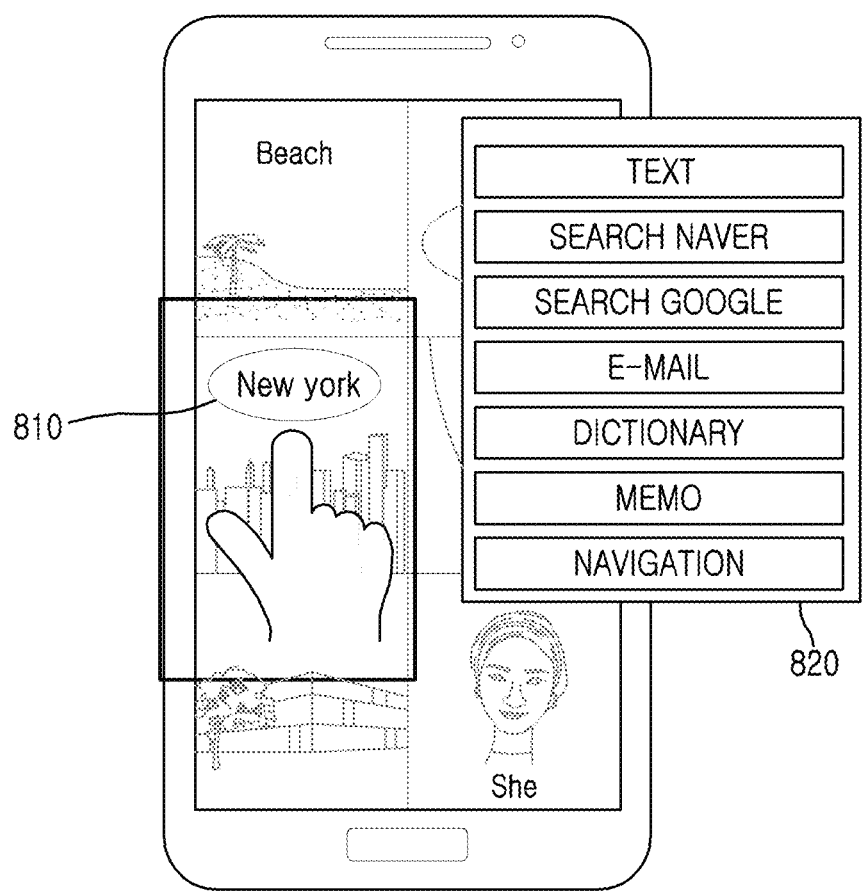
FIG. 8 is a diagram illustrating an example of recognizing a specific character inside an image and displaying a plurality of applications related to the recognized result according to various embodiments of the present invention.

According to various embodiments of the present invention, after a barcode or a QR code is analyzed via a barcode or QR code recognition module, a related application may be displayed as in FIG. 8.

FIG. 7A illustrates an example in which, after a character object (e.g., URL address information) is designated in an image and a character recognition module (e.g., an Optical Character Reader (OCR) module) is selected based on a method for recognizing image content of FIG. 5 or FIG. 6, content of the object region is analyzed via the character recognition module.

FIG. 7B illustrates an output corresponding to a result of the analysis described with reference to FIG. 7A. For example, when a URL address "www.samsung.com" is recognized in FIG. 7A, a user accesses a site corresponding to www.samsung.com via a web browser.

FIG. 8 is a diagram illustrating an example of recognizing a specific character inside an image and displaying a plurality of applications related to the recognized character according to various embodiments of the present invention.

Referring to FIG. 8, when a plurality of movie posters are previewed via an image sensor, after an object region is designated and a character recognition module is selected, a related application list 820 is displayed based on results of the analysis performed by the character recognition module. Then, a user executes one of the applications existing in the application list.

For example, when a user gesture for character recognition is defined as drawing a circle on a touchscreen, a user may draw a circle 810 on a relevant object region (a word 'New York') during a preview state. At this point, the electronic device detects a user gesture applied to a touch panel, and then recognizes that the user gesture is a gesture for requesting extraction of a character from an image, and cropping an image of an object region 810 designated by the user gesture to extract the characters ('New York') from the cropped image. Generally, when shooting (i.e., photographing) an object using an image sensor, a process of focusing may be included. When a specific user gesture is input in a specific object region, the electronic device uses the point at which the user gesture has been input as a focus region. At this point, an area of an object region selected according to a user gesture may be different depending on the user gesture itself. For example, when an object is focused, even when a photo shutter key is not applied, character information is extracted from the object region and provided to a user. Also, when a character is extracted from the object region, a list of applications that are able to process the relevant character appear. According to various embodiments of the present invention, when a specific application is selected, an application that is able to process a relevant character may be executed. For example, when a character "New York" is designated and focused, a character recognition module (e.g., an OCR module) operates, and when a memo application is selected from an application list, a phrase 'New York' may be stored via the memo application.

According to various embodiments of the present invention, when content of an image is processed completely, a camera app may return to a general shooting mode.

Figure 9A:
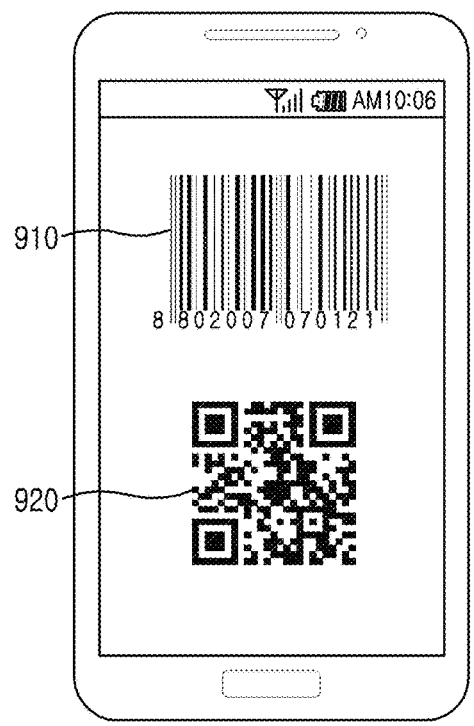
FIGS. 9A, 9B and 9C are diagrams illustrating an example of recognizing a barcode or a QR code and displaying a plurality of applications related to the recognized result according to various embodiments of the present invention.
Figure 9B:
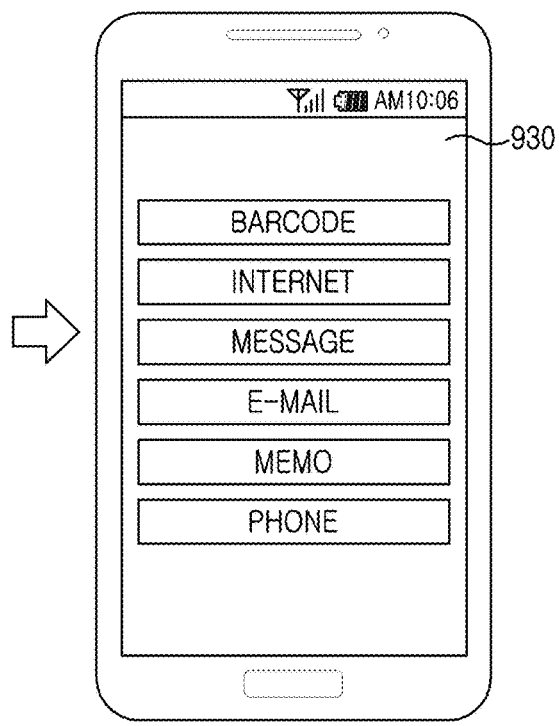
Figure 9C:
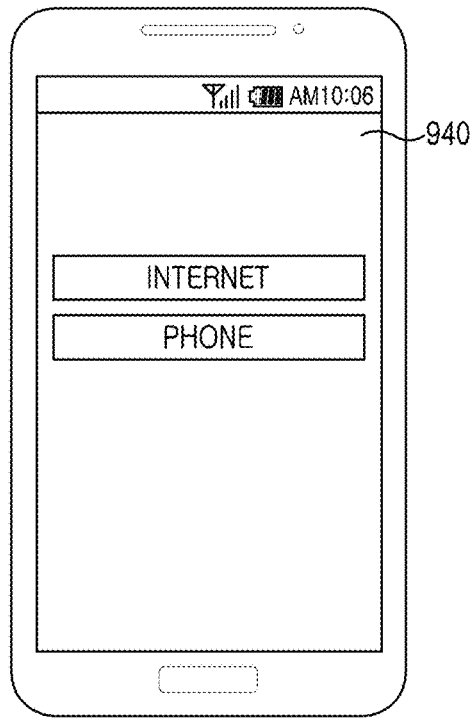

FIGS. 9A, 9B and 9C are diagrams illustrating an example of recognizing a barcode or a QR code and displaying a plurality of applications related to the recognized result according to various embodiments of the present invention.

FIG. 9A illustrates an example of recognizing a barcode or a QR code existing in a specific region of an image during a preview state. In FIG. 9A, a barcode or a QR code may be selected.

FIG. 9B illustrates an example of displaying a list of applications related to the barcode recognized in FIG. 9A. For example, when an e-mail, a phone number, home page information, etc. exist in information included in the recognized barcode, applications related thereto (e.g., a barcode, the Internet, a message, an e-mail, a memo, a phone application) are displayed.

FIG. 9C illustrates an example of displaying a list of applications related to the QR code recognized in FIG. 9A. For example, the Internet and phone applications corresponding to the recognized QR code are displayed.

Figure 10:
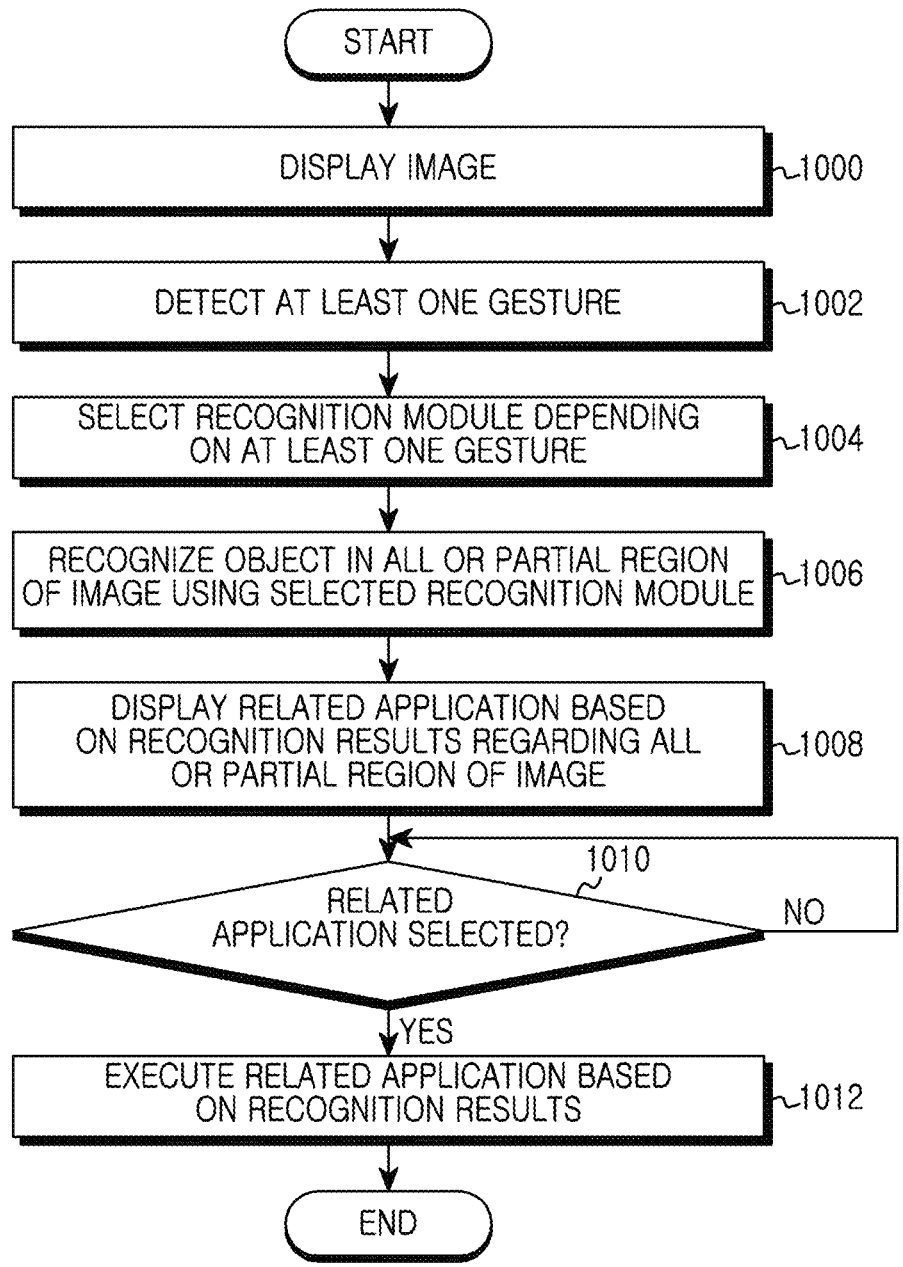
FIG. 10 is a flowchart illustrating a method for recognizing image content and executing a related application in an electronic device according to various embodiments of the present invention.

FIG. 10 is a flowchart illustrating a method for recognizing image content and executing a related application in an electronic device according to various embodiments of the present invention.

Referring to FIG. 10, the electronic device displays an image via a display, in step 1000. The image may be obtained via an image sensor that is previewed to a user and then provided to the electronic device, or may be a photo or a moving picture stored in a memory in advance.

The electronic device detects at least one user gesture, in step 1002. For example, a partial region in the image may be designated as an object region via a first user gesture, and an object recognition module for analyzing the designated object region may be selected via a second user gesture. For example, the first user gesture may be a touch neighboring the object region or a touch detected within the object region, and the second user gesture may be mapped to a relevant object recognition module and may be defined by a user touch pattern input.

According to various embodiments of the present invention, the second user gesture may be used as an instruction to request driving an object recognition module, and in this case, the electronic device may determine a kind of an object region using a predetermined reference. For example, the electronic device may determine a type of code using a characteristic of a relevant code, as described in further detail herein with reference to FIGS. 15-17.

According to various embodiments of the present invention, object region designation and an object recognition module may be determined via a single user gesture. For example, when a user gesture of a quadrangular shape is input at the center of an object region, the input quadrangle becomes an object region and the quadrangle represents a first object recognition module. When a user gesture of a circular shape is input for the center of an object region, the input circle becomes an object region and the circle represents a second object recognition module.

According to various embodiments of the present invention, the electronic device may additionally perform an operation of improving an image using the designated object region as a reference. For example, when the image is a preview image, the designated object region is mainly focused and accordingly, a new image having an improved image quality is obtained. Alternatively, image quality may be improved using brightness, definition, contrast, or an exposure of an image as a reference.

The electronic device selects an object recognition module according to at least one user gesture, in step 1004, analyzes at least a partial object region inside the image using the selected object recognition module, in step 1006, and displays related applications based on the results of the analysis, in step 1008.

Figure 11:
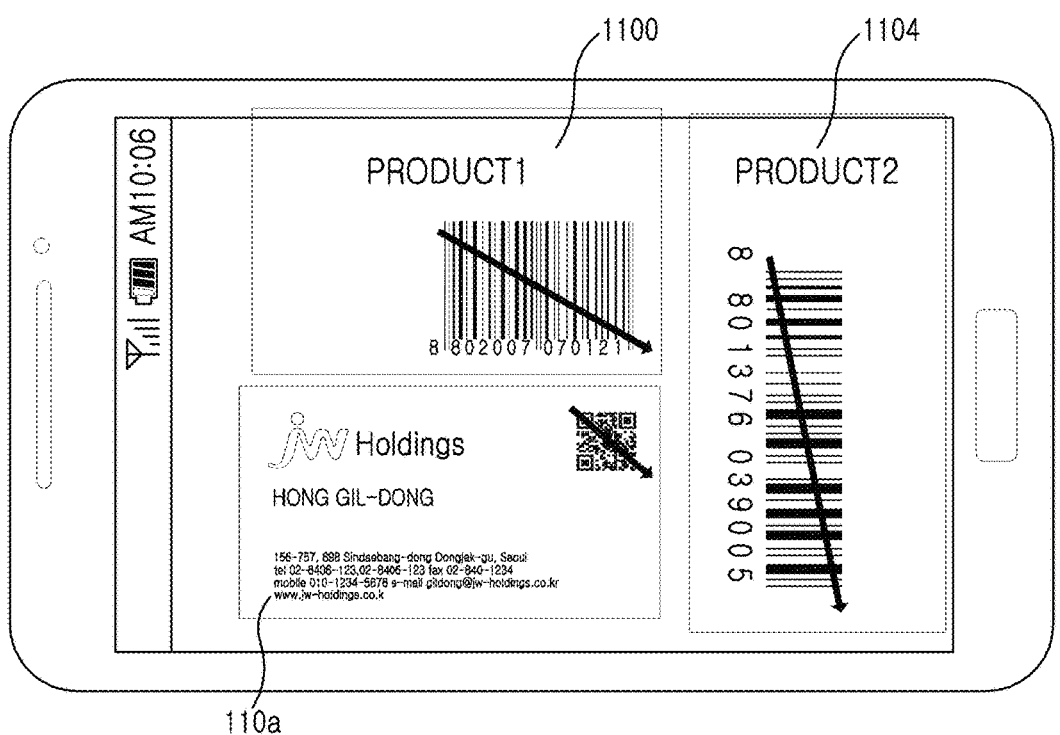
FIG. 11 is a diagram illustrating a user interface for selecting a plurality of objects inside an image and driving a relevant recognition module according to various embodiments of the present invention.

When one of the related applications is selected in step 1010, the electronic device proceeds to step 1012 to execute the selected related applications. FIG. 11 is a diagram illustrating a user interface for selecting a plurality of objects inside an image and driving a relevant recognition module according to various embodiments of the present invention.

Referring to FIG. 11, when objects (i.e., a business card 1102, a $1^{st}$ product 1100, and a $2^{nd}$ product 1104) of various different kinds are included in a single image, an object recognition module corresponding to each object is driven via the same user gesture (i.e., a touch dragged from the left upper side to the right lower side of an object region). An amount of operations and an amount of a memory use for image processing may be reduced by limiting a range of an object region for recognizing each object in an image region.

Here, an object recognition module corresponding to each object region may be determined via image processing or pattern analysis.

For example, when a user gesture is an oblique line as shown in FIG. 11, a start point of the oblique line is designated as the left upper end of an object region to designate, and an end point of the oblique line is designated as the right lower end of the object region. Also, according to other various embodiments of the present invention, a user gesture (e.g., a quadrangular shape or a circular shape) allowing a relevant object to be included in an object region to recognize may be used. Alternatively, the user gesture may be a touch, which may exist close to or the inside of an object. When a touch exists inside of an object, density of a pattern, a shape of a pattern, an edge of a pattern, a surplus margin of a pattern, color distribution, etc. are determined, in order to designate a region including an object.

When designating an object region, the electronic device may determine a type of a relevant object by using a pattern distribution, a shape and frequency, color, brightness information, etc. of the relevant object, or a pattern forming the relevant object in the designated region. Alternatively, when a user gesture for designating an object recognition module or another function is input, the electronic device may designate a recognition module by examining an image pattern corresponding to input coordinates. More specifically, a user gesture input is used as a type of a scan line for analyzing pixel information of an image. For example, pattern information (e.g., finer pattern, start and end patterns, and an alignment pattern) included in a barcode or a two-dimensional image code are used as an identify symbol representing information of a position, a direction, a slope, etc. of a code. Since this pattern is defined according to a predetermined reference, a type of a relevant code is determined via pattern information. When a user gesture is dragged in an oblique line, such as in FIG. 11, when a pattern of a barcode, a start pattern and an end pattern (i.e., a ratio of widths of black sticks and white sticks) may be recognized, so that an object of a barcode shape may be easily determined. When the relevant object is a QR code of a business card, an oblique line of a user gesture passes through many patterns of the QR code image, and when passing a finger through such a pattern among relevant black and white patterns, or a brightness difference to be detected is input at a ratio of 1:1:3:1:1 (e.g., see finder pattern in FIG. 15), for example, so that a QR code is easily recognized.

Figure 12:
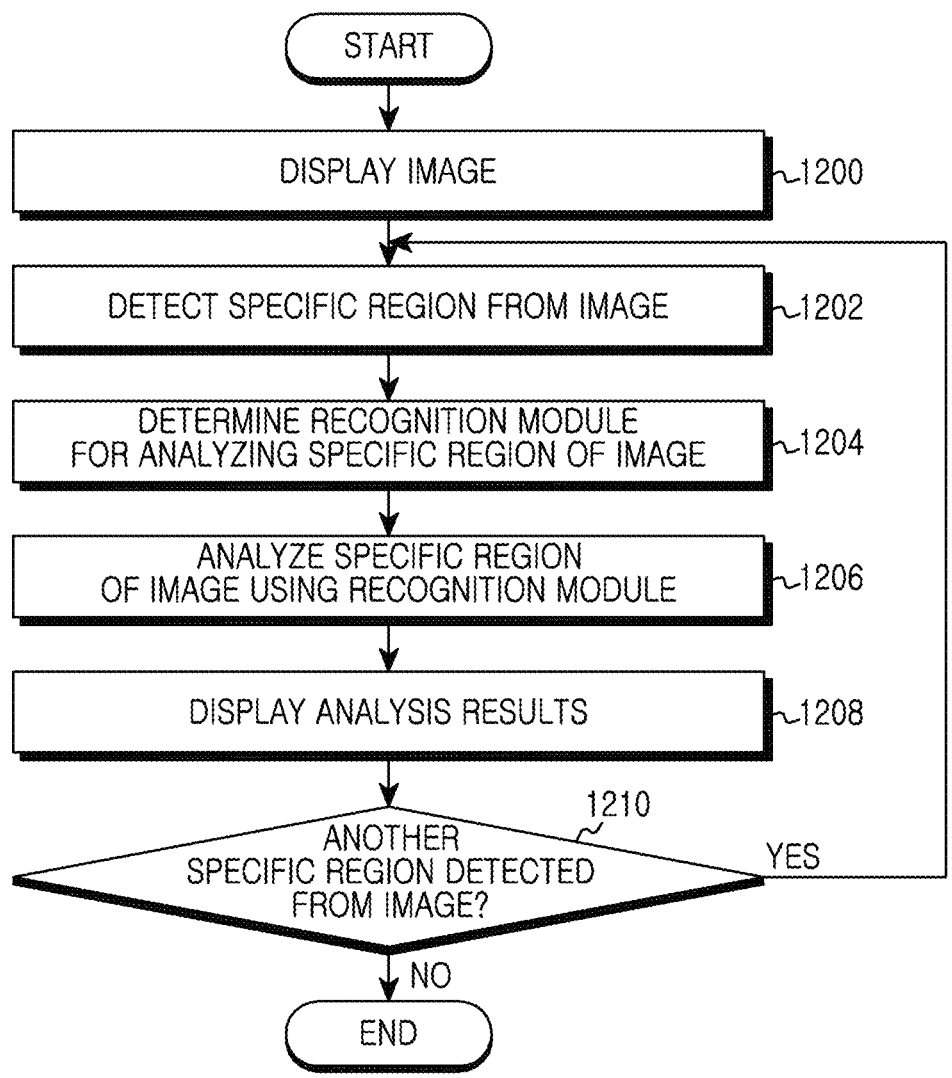
FIG. 12 is a flowchart illustrating a method for selecting a plurality of objects inside an image and driving a relevant recognition module according to various embodiments of the present invention.

FIG. 12 is a flowchart illustrating a method for selecting a plurality of objects inside an image and driving a relevant recognition module according to various embodiments of the present invention.

Referring to FIG. 12, the electronic device displays an image via a display, in step 1200. The image may be obtained via an image sensor that is previewed to a user and then provided to the electronic device, or may be a photo or a moving picture stored in a memory in advance.

The electronic device selects an object region from the image according to a user gesture, in step 1202, determines an object recognition module corresponding to the object region, in step 1204, analyzes an object region inside the image using the determined object recognition module, in step 1206, and displays the results of the analysis, in step 1208.

When a different object region is detected from the image by a user gesture, in step 1210, the electronic device performs steps 1202 to 1208 again.

In various embodiments, after a plurality of object regions are designated, object recognition modules corresponding to the plurality of object regions may be selected and analyzed in parallel.

Figure 13:
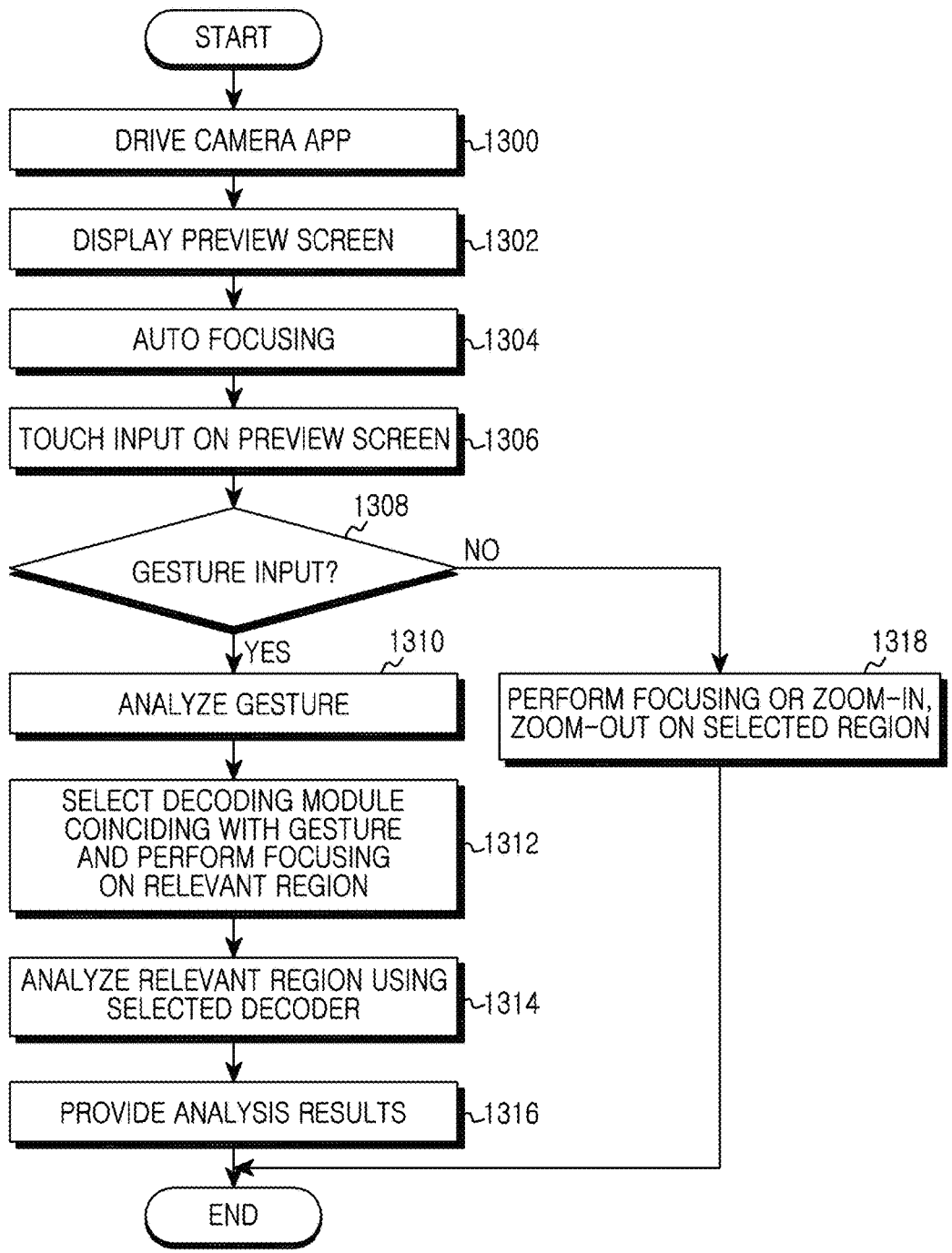
FIG. 13 is a flowchart illustrating a method for recognizing image content during a preview state of a camera according to various embodiments of the present invention.

FIG. 13 is a flowchart illustrating a method for recognizing image content during a preview state of a camera according to various embodiments of the present invention.

Referring to FIG. 13, the electronic device drives a camera app, in step 1300, displays a preview screen, in step 1302, and performs auto-focusing, in step 1304.

The electronic device receives a touch input on a preview screen, in step 1306, and determines whether the touch input is a user gesture, in step 1308.

When the touch input is the user gesture input in step 1308, the electronic device analyzes the user gesture, in step 1310, and selects a recognition module corresponding to the user gesture and focuses on a relevant object region, in step 1312.

In the present example, an object region to recognize and an object recognition module is selected via user gesture analysis.

When a region including a minimum portion of an object is designated via the user gesture, the electronic device analyzes a pattern or a pattern arrangement state, etc. of the object based on the designated region to recognize a range required for recognizing an object. For example, when an object region is automatically designated, the electronic device determines an object region to recognize within an image using a shape, a size, a position, color of the object, and density of a pattern, etc. as a reference. For example, this process may be used to recognize a facial region from a photo or a preview image. In this case, the electronic device may find out facial region candidates primarily by using color, and determine whether a candidate is a face based on position information of facial features such as an eyebrow, an eye, a mouth, etc. in this region. When the relevant object is a barcode or a QR code region, the electronic device may find out a specific pattern, such as a barcode or a two-dimensional image code, etc., via a scan line from an image, and then determine a position and a region of the code using this information. When the object corresponds to a character region, the electronic device may recognize a character or number, symbol region candidates based upon certain characteristics of the characters, such as gathering of characters within a predetermined distance of each other, and/or division of characters on a line-by-line basis. Since the candidates may be one or more candidates, the electronic device may additionally include an operation of extracting a plurality of candidates according to a predetermined reference, for example, a size, a shape, a position, etc. depending on cases, displaying the candidates on a display, and selecting at least one of the candidates according to a user input.

In various embodiments of the present invention, an object region is designated based on a position designated by a user gesture. For example, when a specific position of a displayed image is designated in a preview image, an operation for designating a region related to the relevant position is performed. For this purpose, the electronic device may recognize a position at which a touch or tap, hovering, dragging, sweeping, etc. have occurred, designate a region in the relevant position is included or a region of most neighboring one or more objects, or designate an object region including a minimum portion of a region designated by a user interface. For this purpose, the electronic device may recognize a size, color, brightness, a shape, etc. of an object and determine whether an area suitable to be designated as a relevant region by determining density, color, an edge of an object, etc., using positions designated by a user interface. For example, the electronic device may determine color of the neighborhood around the designated position, and determine a same-color region as a facial region candidate. When the relevant object is a barcode, a surplus marginal portion called a Quiet Zone (QZ) exists around a code pattern. In most cases, a white margin in the neighborhood of a barcode is the QZ and is intended for easily separating a code pattern from a background image. More specifically, since the QZ is a region sufficiently larger than an interval between code patterns, a code pattern and the other regions may be easily discriminated using a density difference of a QZ pattern. When the relevant object region is a character/number region, line and character regions may be discriminated using density of neighboring objects based on input position information. A color code, etc. may be shapes such as a quadrangle, a circle, etc. where a plurality of cells adjoin to represent a code, and a shape and a boundary of this object may be recognized by tracking an edge.

According to various embodiments of the present invention, when successive images, such as a preview image, a video, or an animation GIF, a user interface informing the user of a relevant object region while maintaining a position of the selected object region constantly may be displayed. For example, a region recognized as a barcode region may be displayed using translucence, color, brightness, etc., or displayed using an outline, a mark, a figure, etc., and the user interface may be maintained, even when subsequent images are newly-input. This form of recognition and display easily provides a function by a user input unit such as selection or gesture input, etc. to a user by constantly tracking a changed position in case of the candidate object region or the selected object region. Tracking of the changed position may be obtained by calculating a differential image with respect to a previously input image and successive images input afterward (e.g., for every frame, or after a predetermined time period) and obtaining a changed movement vector, etc. Alternatively, tracking of a changed position may be obtained by using the region extracting method for every necessary image. Generally, since the method of obtaining tracking of a changed position every time increases a processing time and an amount of memory used, the electronic device may perform a process of determining whether the object region select operation needs to be performed, according to whether a difference between the images is very large or a new object is input, etc. via a differential image analysis, and then perform the object region select operation. Alternatively, when a predetermined time elapses from an occurrence time of the previously performed object region select operation, the electronic device may recognize the time lapse as a condition for performing the process for determining whether to perform the object region select operation, and perform the region designation process with respect to a newly-input image.

According to various embodiments of the present invention, a code recognition module may include at least one of various types of image codes, such as one-dimensional barcode such as a Universe Product Code (UPC), an International Article Number (EAN), an International Standard Book Number (ISBN), etc., a matrix type two-dimensional code such as a Quick Response (QR) code, a data matrix, a maxi code, a ColorCode, etc., and a layered code of a type where barcodes overlap in multiple layers such as Portable Delta File (PDF)417, etc. The type of image code may be selected by a user gesture. Alternatively, when the code recognition module is driven, the electronic device may determine the code type and drive a relevant code recognition module.

Although an operation of designating an object region and an operation of selecting an object recognition module may be performed separately, these operations may be performed simultaneously according to a single user gesture. For example, when a user gesture is input, the electronic device may recognize a region including a portion of a region where a user gesture has occurred as the object region. The object region may include a position where a touch for starting of a gesture has occurred, a position where an end of the gesture has occurred, or positions of one or more objects existing on a path where the gesture has occurred.

A position where a gesture occurs may include regions other than a designated object region. For example, when one or more designated object regions exist, and all of relevant object regions are barcodes, when a gesture input occurring in a region other than a designated object region is a barcode recognition instruction, a decoding instruction for barcodes of the designated object regions may be performed and the results thereof may be displayed on a display by user selection.

According to another embodiment of the present invention, the electronic device may designate a type of a decoder or a module to operate using pattern information of an image included in a path where a gesture has occurred. For example, when a user has made a gesture including an image of a start pattern portion of a barcode pattern in order to recognize a one-dimensional barcode, such as an EAN or an ISBN, it is easy to recognize this image as a one-dimensional barcode. Therefore, when a gesture input occurs in a region including at least one of a start pattern, an end pattern, and a data pattern representing a characteristic of a one-dimensional barcode, it is possible to determine a kind by analyzing pattern information of an image region where stroke information has occurred when the gesture is input. According to still another embodiment of the present invention using a similar method, it is possible to determine a kind by analyzing unique pattern information (an eye bull mark, a code alignment pattern, a finder pattern, etc.) held by a two-dimensional barcode in an image region through which a gesture passes. For example, since a QR code is a quadrangular image code having three finding patterns, a path on a stroke is tracked in the designated object region, and when pattern information of a ratio of 1:1:3:1:1, which is a characteristic of a finder pattern is found, a QR code may be recognized.

The electronic device analyzes a relevant object region using a selected object recognition module, in step 1314, and provides analysis results, in step 1316.

By contrast, when a touch input is not the user gesture, in step 1308, the electronic device proceeds to step 1318 to perform a function related to camera shooting, such as focusing or performing zoom-in/zoom-out with respect to the selected region.

FIGS. 14A, 14B, 14C and 14D are diagrams illustrating types of codes including information according to various embodiments of the present invention.

Figure 14A:
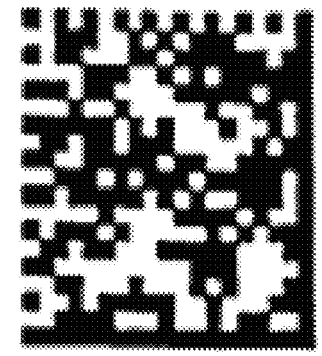
FIGS. 14A, 14B, 14C and 14D are diagrams illustrating a kind of a code including information according to various embodiments of the present invention.
Figure 14B:
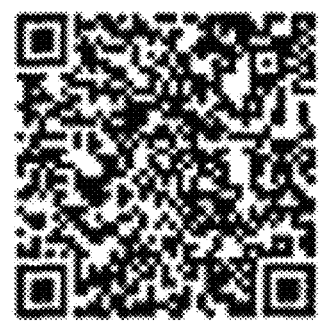
Figure 14C:
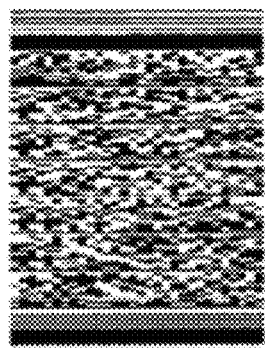
Figure 14D:
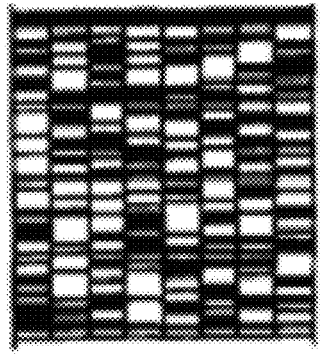

FIG. 14A illustrates a data matrix, FIG. 14B illustrates a QR code, FIG. 14C illustrates a PDF417 code, and FIG. 14D illustrates a code 49 code.

The data matrix of FIG. 14A is a two-dimensional barcode of high density that may encode up to 3110 characters in a whole 256-byte ASCII character set, the QR code of FIG. 14B is a matrix type two-dimensional barcode representing information using a black and white lattice-shaped pattern, the PDF417 code of FIG. 14C is a two-dimensional symbol code having a variable symbol length and a variable symbol height, and the code 49 code of FIG. 14D is a multi-layered successive type symbology where a small data length is variable and may be expressed using all 128 ASCII characters.

FIGS. 15A, 15B, 15C, 15D, 15E and 15F are diagrams illustrating examples of recognition of a QR code based on a user's gesture according to various embodiments of the present invention.

Referring to FIGS. 15A-15F, a QR code includes a Finder pattern, an alignment pattern, and a data region. The Finder pattern exists in a quadrangular edge at a ratio of 1:1:3:1:1 of a black and white pattern, and is used for detecting a position of a QR code in a decoder application. The alignment pattern exists at a ratio of 1:1:3:1:1 of a black and white pattern between Finder patterns, and is used to determine coordinates of a symbol in a decoder application.

FIG. 15A illustrates a user gesture detected in a diagonal line from a first Finder pattern to a third Finder pattern, FIG. 15B illustrates a user gesture detected in a first Finder pattern to a second Finder pattern from the left to the right, FIG. 15C illustrates a user gesture detected in a first Finder pattern region, FIG. 15D illustrates a user gesture detected in a sequence of a first Finder pattern, a second Finder pattern, and a third Finder pattern direction, FIG. 15E illustrates a user gesture detected in a sequence of a first Finder pattern, a second Finder pattern, a third Finder pattern, and a fourth Finder pattern, and FIG. 15F illustrates a character Q input inside a QR code via a user gesture.

As described above, the electronic device recognizes a QR code by recognizing a user gesture pattern based on Finder pattern information of a QR code, or recognizes a QR code via a user gesture of a Q character input indicating a QR code.

FIGS. 16A, 16B, 16C and 16D are diagrams illustrating examples of recognition of a data matrix based on a user's gesture according to various embodiments of the present invention.

Referring to FIGS. 16A-16D, similar to a QR code, a data matrix includes a Finder pattern, an alignment pattern, and a data region. However, a Finder pattern of a data matrix is positioned at a left boundary portion and a bottom boundary portion, such as in FIG. 16B, and may exist in a right boundary portion and a top boundary portion at a ratio of 1:1:1:1:1 of a black and white pattern, such as in FIG. 16A.

FIG. 16A illustrates a user gesture detected based on an alignment pattern existing at a ratio of 1:1:1:1:1 of a black and white pattern at a right boundary portion and a top boundary portion, FIG. 16B illustrates a user gesture detected based on a Finder pattern existing at a left boundary portion and a bottom boundary portion, FIG. 16C illustrates a user gesture detected based on an alignment pattern existing at a ratio of 1:1:1:1:1 of a black and white pattern at a right boundary portion and a top boundary portion and a Finder pattern existing at a left boundary portion and a bottom boundary portion, and FIG. 16D illustrates a character "D" input inside a data matrix via a user gesture.

As described above, the electronic device recognizes a data matrix by recognizing a user gesture pattern based on a Finder pattern and alignment pattern information of a data matrix, or by recognizing a data matrix via a user gesture of an input character D, which indicates a data matrix.

FIGS. 17A, 17B, 17C and 17D are diagrams illustrating examples of recognition of a PDF417 or a barcode based on a user's gesture according to various embodiments of the present invention.

Referring to FIGS. 17A, 17B, 17C and 17D, a PDF417 includes a start pattern, an end pattern, and a data region. The start pattern indicates a start of a code, and the end pattern indicates an end of a code. Though not shown, a left row indicator indicating a left side may be positioned next to the start pattern, and a right row indicator indicating a right side may be positioned next to the end pattern. Also, alignment patterns are punctuated in a PDF417, as shown in FIG. 17C.

FIG. 17A illustrates a user gesture detected in a straight line from a point where a start pattern exists to a point where an end pattern exists, FIGS. 17B and 17C each illustrate a user gesture detected in a diagonal direction from a point where a start pattern exists to a point where an end pattern exists, and FIG. 17D illustrates a character "P" input inside a data matrix via a user gesture.

As described above, the electronic device recognizes a PDF417 code by recognizing a user gesture pattern based on start pattern, end pattern, and alignment pattern information, or recognizes the PDF417 via a user gesture of a P character input indicating the PDF417.

An electronic device according to embodiments of the present invention may include a device having a communication function. For example, the electronic device may include any one of or a of devices such as a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an Moving Picture Experts Group (MPEG) audio layer 3 (MP3) player, a mobile medical device, an electronic bracelet, an electronic necklace, an electronic accessory, a camera, a wearable device, an electronic clock, a wrist watch, a smart white appliance (e.g., a refrigerator, an air conditioner, an artificial intelligence robot, a TeleVision (TV), a Digital Video Disk (DVD) player, an audio player, an oven, an electronic range, a washing machine, an air purifier, an electronic frame, etc.), various medical devices (e.g., Magnetic Resonance Angiography (MRA), Magnetic Resonance Imaging (MRI), Computed Tomography (CT), a shooting device, an ultrasonic device, etc.), a navigation device, a Global Positioning System (GPS) receiver, an Event Data Recorder (EDR), a Flight Data Recorder (FDR), a set-top box, a TV box (for example, Samsung HomeSync™, Apple TV™, or Google TV™), an automobile infotainment device, electronic equipment for a ship (for example, a navigation device for a ship, a gyro compass, etc.), an avionics, a security device, electronic clothing, an electronic key, a camcorder, game consoles, a Head-Mounted Display (HMD), a flat panel display device, an electronic album, a portion of a furniture or a building/structure including a communication function, an electronic board, an electronic signature receiving device, or a projector. Electronic devices according to embodiments of the present invention are not limited to the above-described devices.

Figure 18:
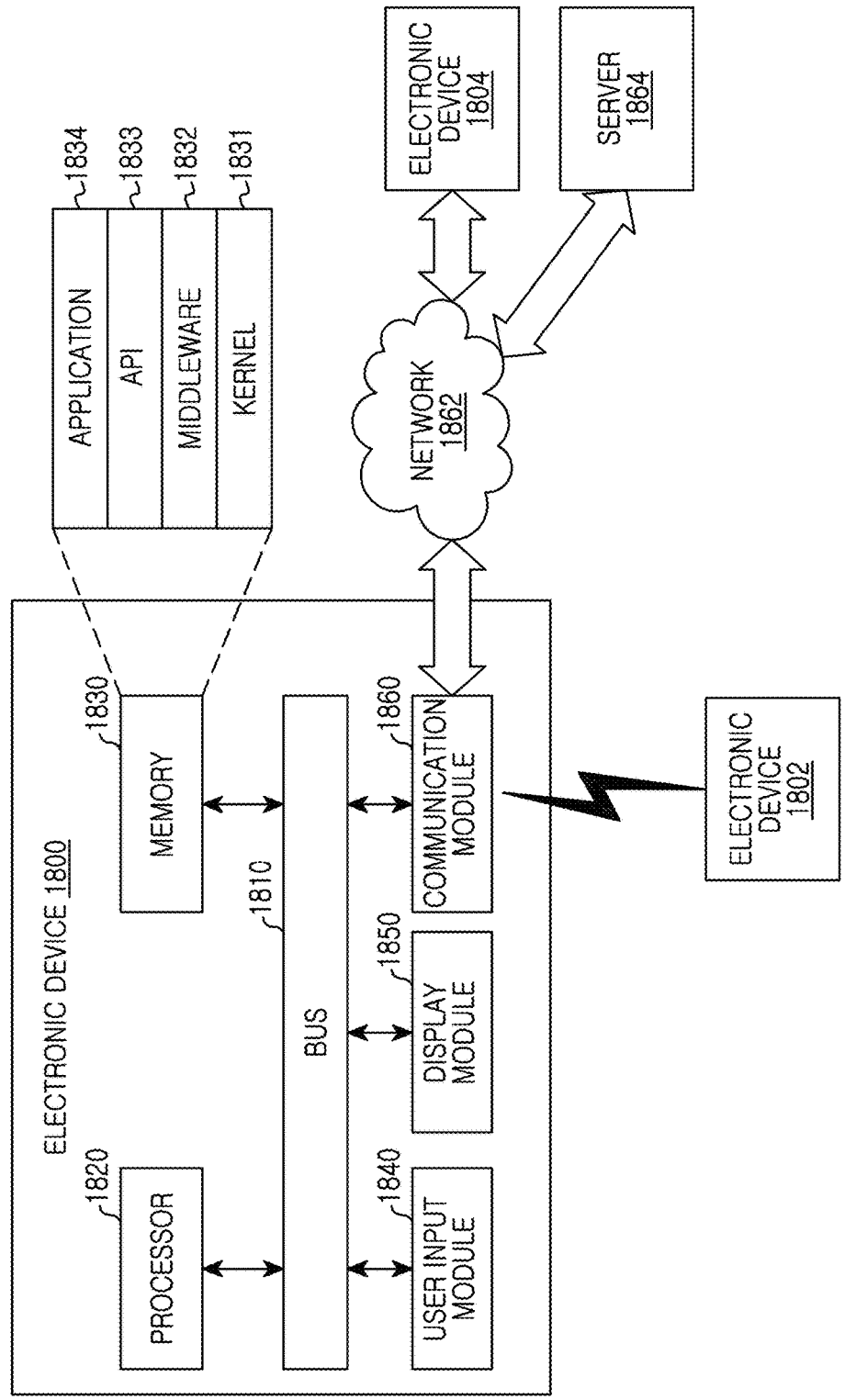
FIG. 18 is a block diagram illustrating an electronic device according to various embodiments of the present invention.

FIG. 18 is a block diagram illustrating an electronic device according to various embodiments of the present invention.

Referring to FIG. 18, the electronic device 1800 includes a bus 1810, a processor 1820, a memory 1830, a user input module 1840, a display module 1850, and a communication module 1860.

The bus 1810 is a circuit that connects the above-described elements and transfers communications (e.g., control messages) between the above-described elements.

The processor 1820 may receive, for example, an instruction from the above-described other elements (e.g., the memory 1830, the user input module 1840, the display module 1850, the communication module 1860, etc.) via the bus 1810, decipher the received instruction, and execute an operation or a data process corresponding to the deciphered instruction.

The memory 1830 stores instructions received from the processor 1820 or other elements (e.g., the user input module 1840, the display module 1850, the communication module 1860, etc.), or an instruction or data generated by the processor 1820 or other elements. The memory 1830 includes programming modules such as a kernel 1831, a middleware 1832, an Application Programming Interface (API) 1833, or an application 1834. The each of the programming modules may be configured using software, firmware, hardware, or a combination of at least two of these elements.

The kernel 1831 controls and manages system resources (e.g., the bus 1810, the processor 1820, or the memory 1830, etc.) used for executing operations or functions implemented in the rest of the programming modules (e.g., the middleware 1832, the API 1833, or the application 1834). The kernel 1831 also provides an interface for allowing the middleware 1832, the API 1833, or the application 1834 to access an individual element of the electronic device 1800 and control or manage the same.

The middleware 1832 performs a mediation role so that the API 1833 or the application 1834 is able to communicate with the kernel 1831 to send and receive data. In connection with task requests received from the applications 1834, the middleware 1832 performs load balancing for a task request using, for example, a method of assigning priority that may use a system resource (e.g., the bus 1810, the processor 1820, or the memory 1830, etc.) of the electronic device to at least one of the applications 1834.

The API 1833 is an interface that allows the application 1834 to control a function provided by the kernel 1831 or the middleware 1832, and may include at least one interface or function for file control, window control, image processing, or character control, etc.

The user input module 1840 may receive, for example, an instruction or data from a user and transfer the same to the processor 1820 or the memory 1830 via the bus 1810. The display module 1850 displays an image, a video, or data, etc. to a user.

The communication module 1860 may connect communication between another electronic device 1802 and the electronic device 1800. The communication module 1860 may support a predetermined short distance communication protocol (e.g., Wireless Fidelity (Wi-Fi), Bluetooth (BT), Near Field Communication (NFC)), or a predetermined network communication 1862 (e.g., Internet, Local Area Network (LAN), Wide Area Network (WAN), a telecommunication network, a cellular network, a satellite network, or Plain Old Telephone Service (POTS), etc.). Each of the electronic devices 1802 and 1804 may be the same or different type of device as the electronic device 1800.

The communication module 1860 may connect the electronic device 1800 with a different electronic device 1804 and a server 1864 via the network 1862.

Figure 19:
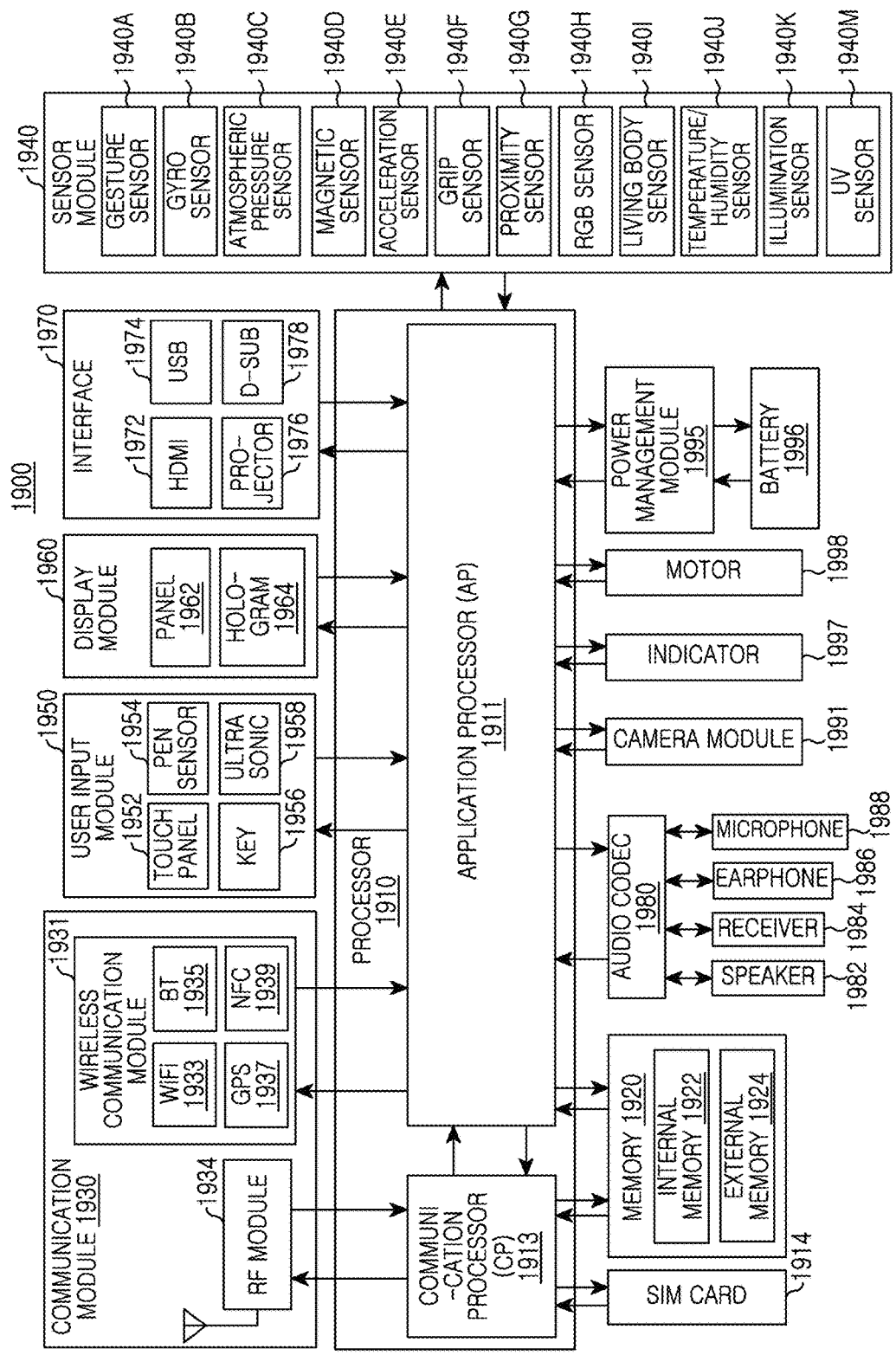
FIG. 19 is a block diagram illustrating a hardware according to various embodiments of the present invention.

FIG. 19 is a block diagram illustrating hardware according to various embodiments of the present invention. The hardware 1900 may be, for example, the electronic device 1800 illustrated in FIG. 18. Referring to FIG. 19, the hardware 1900 includes at least one processor 1910, a Subscriber Identifier Module (SIM) card 1914, a memory 1920, a communication module 1930, a sensor module 1940, a user input module 1950, a display module 1960, an interface 1970, an audio codec 1980, a camera module 1991, a power management module 1995, a battery 1996, an indicator 1997, and a motor 1998.

The processor 1910 (e.g., the processor 1820) includes at least one Application Processor (AP) 1911 and at least one Communication Processor (CP) 1913. The processor 1910 may be, for example, the processor 1820 illustrated in FIG. 18. Although FIG. 19 illustrates the AP 1911 and the CP 1913 within the processor 1910, the AP 1911 and the CP 1913 may be included in different Integrated Circuit (IC) packages, respectively. For example, according to an embodiment of the present invention, the AP 1911 and the CP 1913 may be included inside one IC package.

The AP 1911 drives an Operating System (OS) or an application to control a plurality of hardware or software elements connected to the AP 1911, and performs various data processing, including multimedia data and operations. The AP 1911 may be implemented using, for example, a System On a Chip (SoC). According to an embodiment of the present invention, the processor 1910 may further include a Graphics Processing Unit (GPU) (not shown).

The CP 1913 performs a function of managing a data link and converting a communication protocol during communication between an electronic device (e.g., the electronic device 1800) including the hardware 1900 and other electronic devices connected via a network. The CP 1913 may be, for example, implemented using an SoC. According to an embodiment of the present invention, the CP 1913 may perform at least a portion of a multimedia control function. The CP 1913 may perform, for example, discrimination and authentication of a terminal inside a communication network using a Subscriber Identity Module (SIM) card 1914. Also, the CP 1913 may provide services such as voice communication, video communication, a short message service, or packet data, etc. to a user.

The CP 1913 also controls data transmission/reception of the communication module 1930. Although elements such as the CP 1913, the power management module 1995, or the memory 1920, etc. are illustrated as elements separated from the AP 1911 in FIG. 19, the AP 1911 may be implemented to include at least a portion (e.g., the CP 1913) of the above-described elements according to an embodiment of the present invention.

According to an embodiment of the present invention, the AP 1911 or the CP 1913 may load an instruction or data received from at least one of a non-volatile memory or other elements connected thereto, onto a volatile memory and process the same. Also, the AP 1911 or the CP 1913 may store data received or generated from at least one of other elements in a non-volatile memory.

The SIM card 1914 implements a subscriber identity module, and is inserted to a slot formed in a specific position of the electronic device. The SIM card 1914 includes unique identify information (e.g., an Integrated Circuit Card IDentifier (ICCID)) or subscriber information (e.g., an International Mobile Subscriber Identity (IMSI)).

The memory 1920 includes a built-in memory 1922 or an external memory 1924. The memory 1920 may be, for example, the memory 1830 illustrated in FIG. 18. The built-in memory 1922 may include, for example, at least one of a volatile memory (for example, Dynamic Random Access Memory (RAM) (DRAM), Static RAM (SRAM), Synchronous Dynamic RAM (SDRAM), etc.) and a non-volatile memory (for example, One Time Programmable Read-Only Memory (ROM) (OTPROM), Programmable ROM (PROM), Erasable and Programmable ROM (EPROM), Electrically Erasable and Programmable ROM (EEPROM), mask ROM, flash ROM, NAND flash memory, NOR flash memory, etc.). According to an embodiment of the present invention, the built-in memory 222 may have the form of a Solid State Drive (SSD). The external memory 1924 may further include, for example, Compact Flash (CF), Secure Digital (SD), Micro-SD, Mini-SD, eXtreme Digital (xD), or a memory stick, etc.

The communication module 1930 includes a wireless communication module 1931 or an RF module 1934. The communication module 1930 may be, for example, the communication module 1860 illustrated in FIG. 18. The wireless communication module 1931 may include, for example, a Wi-Fi module 1933, a BlueTooth (BT) module 1935, a GPS module 1937, or an NFC module 1939. For example, the wireless communication module 1931 may provide a wireless communication function using a Radio Frequency (RF). Additionally or alternatively, the wireless communication module 1931 may include a network interface (e.g., a LAN card) or a modem, etc., for connecting the hardware 1900 with a network (e.g., the Internet, a Local Area Network (LAN), a Wide Area Network (WAN), a telecommunication network, a cellular network, a satellite network, or a Plain Old Telephone Service (POTS), etc.).

The RF module 1934 manages transmission/reception of an RF signal (i.e., an electronic signal). Although not shown, the RF module 1934 may include, for example, a transceiver, a Power Amp Module (PAM), a frequency filter, or a Low Noise Amplifier (LNA), etc. Also, the RF module 1934 may further include a part, (e.g., a conductor or a conducting line, etc.) for transmitting/receiving an electromagnetic wave on a free space in wireless communication.

The sensor module 1940 includes, for example, at least one of a gesture sensor 1940A, a gyro sensor 1940B, an atmospheric sensor 1940C, a magnetic sensor 1940D, an acceleration sensor 1940E, a grip sensor 1940F, a proximity sensor 1940G, a Red, Green, Blue (RGB) sensor 1940H, a living body sensor 1940I, a temperature/humidity sensor 1940J, an illuminance sensor 1940K, or an UltraViolet (UV) sensor 1940M. The sensor module 1940 may measure a physical quantity or detect an operation state of the electronic device to convert the measured or detected information to an electric signal. Additionally/alternatively, the sensor module 1940 may include, for example, an E-nose sensor (not shown), an ElectroMyoGraphy (EMG) sensor (not shown), an ElectroEncephaloGram (EEG) sensor (not shown), an ElectroCardioGram (ECG) sensor (not shown), or a fingerprint sensor, etc. The sensor module 1940 may further include a control circuit for controlling at least one sensor belonging thereto.

The user input module 1950 includes a touch panel 1952, a (digital) pen sensor 1954, a key 1956, or an ultrasonic input unit 1958. The user input module 1950 may be, for example, the user input module 1840 illustrated in FIG. 18. The touch panel 1952 recognizes a touch input using at least one of capacitive, resistive, infrared, or ultrasonic methods, for example. The touch panel 1952 may further include a controller (not shown). A capacitive touch panel may perform proximity recognition as well as a direct touch. The touch panel 1952 may further include a tactile layer. In this case, the touch panel 1952 may provide a tactile reaction to a user.

The (digital) pen sensor 1954 may be implemented using, for example, a method which is the same as or similar to receiving a user's touch input, or a separate sheet for recognition. For the key 1956, a keypad or a touch key may be used. The ultrasonic input unit 1958 is a device that may detect a sound wave using a microphone (e.g., the microphone 1988) in a terminal via a pen generating an ultrasonic signal to determine data, and enables wireless recognition. According to an embodiment of the present invention, the hardware 1900 may receive a user input from an external device (e.g., a network, a computer, or a server) connected thereto using the communication module 1930.

The display module 1960 includes a panel 1962 or a hologram 1964. The display module 1960 may be, for example, the display module 1950 illustrated in FIG. 18. The panel 1962 may be, for example, a Liquid Crystal Display (LCD), or an Active-Matrix Organic Light-Emitting Diode (AM-OLED), etc. The panel 1962 may be flexible, transparent, or wearable. The panel 1962 may be configured as one module together with the touch panel 1952. The hologram 1964 may show a 3-dimensional image in the air using interferences of light. According to an embodiment of the present invention, the display module 1960 may further include a control circuit for controlling the panel 1962 or the hologram 1964.

The interface 1970 includes, for example, a High-Definition Multimedia Interface (HDMI) 1972, a Universal Serial Bus (USB) 1974, a projector 1976, or a D-subminiature (D-sub) 1978. Additionally or alternatively, the interface 1970 may include, for example, an SD/Multi-Media card (MMC) (not shown) or an Infrared Data Association (IrDA) module (not shown).

The audio codec 1980 converts voice and an electric signal in dual directions. The audio codec 1980 may convert voice information input or output via, for example, a speaker 1982, a receiver 1984, an earphone 1986, or a microphone 1988, etc.

The camera module 1991 is a device that shoots (i.e., photographs) an image or a moving picture. According to an embodiment of the present invention, the camera module 1991 may include at least one image sensors (e.g., a front lens or a rear lens), an Image Signal Processor (ISP) (not shown) or a flash Light Emitting Diode (LED) (not shown).

The power management module 1995 manages power of the hardware 1900. Although not shown, the power management module 1995 may include, for example, a Power Management Integrated Circuit (PMIC), a charger IC, or a battery fuel gauge.

The PMIC may be mounted, for example, inside an integrated circuit or an SoC semiconductor. A charging method may be divided into a wired method and a wireless method. The charger IC may charge a battery, and prevent introduction of an overvoltage or an overcurrent from a charger. According to an embodiment of the present invention, the charger IC may include a charger IC for at least one of the wired charging method and the wireless charging method. The wireless charging method may include a magnetic resonance method, a magnetic induction method, an electromagnetic wave method, etc. An additional circuit for wireless charging, for example, a circuit such as a coil loop, a resonance circuit, a rectifier, etc. may be added.

The battery gauge measures, for example, a remaining amount of energy of the battery 1996, a voltage, a current, or temperature during a charging operation. The battery 1996 generates electricity to supply power, and may be a rechargeable battery, for example.

The indicator 1997 may display a specific state of the hardware 1900 or a portion thereof (e.g., the AP 1911), for example, a booting state, a message state, or a charging state, etc. The motor 1998 converts an electric signal to mechanical vibration. The MicroController Unit (MCU) 1999 controls the sensor module 1940.

Though not shown, the hardware 1900 may include a processor (e.g., a GPU) for supporting a mobile TV. The processor for supporting the mobile TV may process, for example, media data that complies with a standard such as a Digital Multimedia Broadcasting (DMB), Digital Video Broadcasting (DVB), or media flow, etc.

Names of the above-described elements of the hardware according to embodiments of the present invention may change depending on a type of an electronic device. The hardware according to embodiments of the present invention may include at least one of the above-described elements, and a portion of the elements may be omitted or additional other elements may be further included. Also, a portion of the elements of the hardware according to embodiments of the present invention may combine to form one entity, thereby equally performing the functions of relevant elements before the combining.

Figure 20:
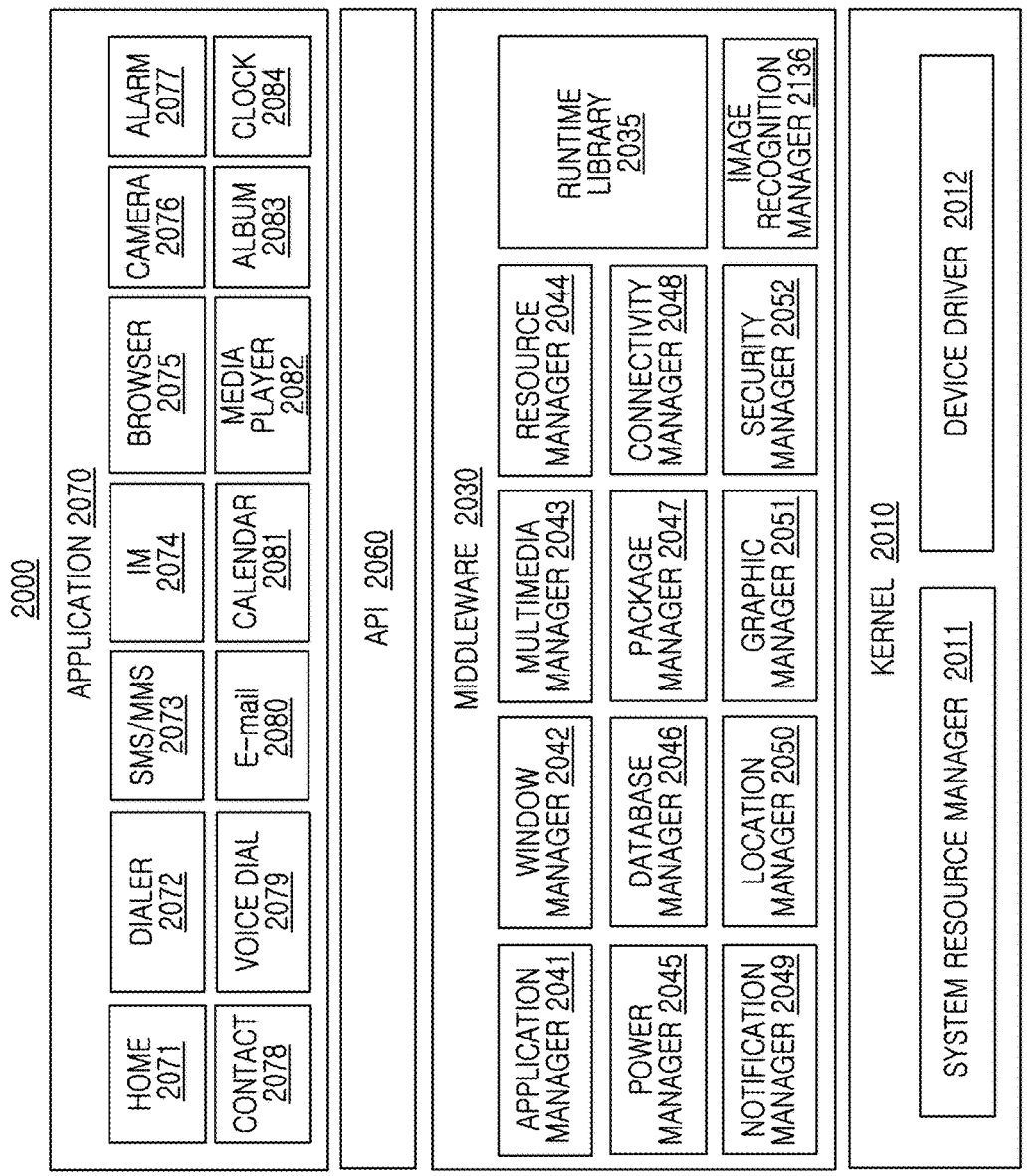
FIG. 20 is a block diagram illustrating a programming module according to various embodiments of the present invention.

FIG. 20 is a block diagram illustrating a programming module according to various embodiments of the present invention.

Referring to FIG. 20, the programming module 2000 may be included (e.g., stored) in the electronic device 1800 (e.g., the memory 1830) illustrated in FIG. 18. At least a portion of the programming module 2000 may be configured using software, firmware, hardware, or a combination of at least two of these. The programming module 2000 may be implemented on hardware (e.g., the hardware 1900) and include an OS controlling resources related to the electronic device (e.g., the electronic device 1800) or various applications (e.g., the application 2070) driven on the OS. For example, the OS may be Android, an iOS, Windows, Symbian, Tizen, or Bada, etc. Referring to FIG. 20, the programming module 2000 may includes a kernel 2010, a middleware 2030, an Application Programming Interface (API) 2060, and an application 2070.

The kernel 2010 (e.g., the kernel 131) includes a system resource manager 2011 and a device driver 312. The system resource manager 2011 includes, for example, a process manager 2013, a memory manager 2015, or a file system manager 2017, etc. The system resource manager 2011 performs control, allocation, or withdrawal, etc. of system resources. The device driver 2012 may include, for example, a display driver, a camera driver, a Bluetooth driver, a share memory driver, a USB driver, a keypad driver, a Wi-Fi driver, or an audio driver. Also, according to an embodiment of the present invention, the device driver 2012 may include an Inter-Process Communication (IPC) driver.

The middleware 2030 may include a plurality of modules implemented for providing a function required in common by the application 2070. The middleware may provide a function via the API 2060, so that the application 2070 may efficiently use limited system resources inside the electronic device. For example, as illustrated in FIG. 20, the middleware 2030 (e.g., the middleware 1832) includes at least one of a runtime library 2035, an image recognition manager 3136, an application manager 2041, a window manager 2042, a multimedia manager 2043, a resource manager 2044, a power manager 2045, a database manager 2046, a package manager 2047, a connectivity manager 2048, a notification manager 2049, a location manager 2050, a graphic manager 2051, and a security manager 2052.

The runtime library 2035 may include, for example, a library module used by a complier in order to add a new function via a programming language while the application 2070 is executed. According to an embodiment of the present invention, the runtime library 2035 may perform input/output, memory management, or a function regarding an arithmetic function, etc.

The application manager 2041 manages a life cycle of at least one of the applications 2070. The window manager 2042 manages a Graphical User Interface (GUI) resource used by a screen. The multimedia manager 2043 has information regarding formats required for reproducing various media files, and performs encoding and decoding of a media file using a codec suitable for a relevant format. The resource manager 2044 manages resources, such as a source code of at least one of the applications 2070, a memory, or a storage space, etc.

The power manager 2045 operates together with a Basic Input/Output System (BIOS), etc. to manage a battery or power, and provides power information, etc. required for an operation. The database manager 2046 manages generation, search, or change to a database to be used by at least one of the applications 2070. The package manager 2047 manages installation or update of an application distributed in the form of a package file.

The connectivity manager 2048 manages wireless connection such as Wi-Fi, or Bluetooth, etc. The notification manager 2049 displays or notifies an event such as an arriving message, a promise, proximity notice, etc., such as in a manner that may not disturb a user. The location manager 2050 manages location information of an electronic device. The graphic manager 2051 manages a graphic effect to be provided to a user or a user interface related thereto. The security manager 2052 provides various security functions required for system security or user authentication, etc. According to an embodiment of the present invention, when an electronic device (e.g., the electronic device 1800) has a phone function, the middleware may further include a telephony manager (not shown) for managing a voice or video communication function of the electronic device.

The image recognition manager 2136 manages a user interface related to object region selection inside an image according to embodiments of the present invention and object recognition module selection.

According to an embodiment of the present invention, the image recognition manager 2136 is a module that performs functions of extracting and separating objects or regions such a person, a thing, a face, a background, etc. from a shot (i.e., captured) image, and identifying at least one primary attribute (an object position inside an image, a relative position or phase between objects/regions, a shape, color, a narrator related information, meta data, etc.) corresponding to each object or each region. The image recognition manager 2136 transfers the primary attributes of the identified object or region to a memory and stores the same, so that when an information inquiry occurs with respect to an object or region included in the image occurs, a process may receive at least one attribute information item corresponding thereto from the memory and process the same. The information inquiry may perform designation of a coordinate or a region by an image, audio, a user input interface, inquiry by a keyword, etc.

The image recognition manager 2136 manages various image processes, such as a pre-process, segmentation, feature extraction, and recognition.

For example, image processing techniques described below may be used in accordance with embodiments of the present invention.

An attribute conversion technique, such as binarization, gray-level scaling, color conversion, etc. may be used, so that unnecessary information may be removed or a processing speed may be increased. According to an embodiment of the present invention, the electronic device may obtain a gain in an aspect of a processing speed to use a binarized black and white image rather than use a color image in order to extract a shape of a specific object from an image. For example, a character, a number, a one-dimensional barcode, a two-dimensional barcode, a facial region, etc. are initially converted to black and white images via binarization, so that an operation amount is reduced while an information or edge extraction operation is performed.

Next, when using a digital image conversion technique such as Fourier Transformation, discrete cosine transformation, wavelet transformation, etc., techniques such as high-pass filtering, low-pass filtering, etc. are easy to apply, so that image enhancement and interested region extraction, etc. may be processed.

Information of pixels forming an image is analyzed, digital image enhancement techniques such as blurring, sharpening, extension, contraction, noise reduction, smoothing, brightness control, etc. are used, so that a loss of primary attributes such as a shape, a position, color, etc. of an object in an image are reduced or recovered, and are used for characteristic extraction and recognition.

A process of checking a size of a digital image, or a size of a specific region and a shape of an object via edge detection, boundary following, feature point extraction, silhouette extraction, color separation, a region coloring algorithm, etc., is required. Operations of finding an outline of a digital image, discriminating color and a pattern, figuring out texture may be used for extracting, discriminating, and recognizing an image. For motion and gesture recognition, the image recognition manager 2136 may analyze two or more images to obtain a differential image between two images, and examine a movement pattern of an object or an amount of change through this to determine movement, a motion, a gesture, etc.

The image recognition manager 2136 may set an image region for image region extraction and user input. The image recognition manager 2136 may apply one or more of the image processing techniques to extract a region of an object such as a facial region, a silhouette of a person or a thing, a movement (motion) of an object. Also, the image recognition manager 2136 may manage storage information such as a range of a relevant region, a coordinate, edge data, silhouette data, etc. in a memory.

The image recognition manager 2136 may display processed recognition results using augmented reality, Virtual Reality (VR), and Mixed Reality (MR) techniques. For example, when processing a two-dimensional image code, the image recognition manager 2136 may obtain information such as pitch, yaw, and roll of a camera, or an object depending on a finder pattern, alignment pattern, or pattern distribution of a code.

For example, when processing a QR code, since a finder pattern exists on a left upper portion, a right upper portion, and a left lower portion of the code image, but does not exist on a right lower portion among four corners of the code image, even when the code image is rotated, the rotated angle of the code may be easily determined. For another example, when processing a data matrix, since left and right edge portions are configured using a thick solid line and up and down are configured using a black and white pattern of 1:1, a rotation angle of the code may be easily determined. Even when processing a one-dimensional barcode or a PDF417, etc., when parity information is used according to a shape of a start pattern, and an end pattern, and a scan direction of a pattern, direction detection is possible.

Together with the above-described processing, since a vertical direction normal vector of the code image may be estimated according to a shape disposed on an (x, y) plane of the code image, a position and a shape, etc. on a three-dimensional (3D) space of a virtual object of augmented reality or a virtual reality may be easily calculated. Therefore, a 3D or 2D virtual object (e.g., GUI information such as a list menu, a photo, an avatar, a 3D character, etc.) may be matched and displayed so that it may correspond to a pattern of the image.

The middleware 2030 may generate and use a new middleware module via various function combinations of the above-described internal element modules. The middleware 2030 may provide a module specialized for each kind of an OS in order to provide a differentiated function. Also, the middleware may dynamically delete a portion of existing elements or add new elements. Therefore, a portion of the elements described according to embodiments of the present invention may be omitted, other elements may be further provided, or the element described according to embodiments of the present invention may be replaced by an element having a different name, but performing a similar function.

The API 2060 (e.g., the API 1833) is a set of API programming functions, and may be provided as different configurations depending on an OS. For example, Android or iOS may provide, for example, one API set for each platform. Tizen may provide, for example, two or more API sets.

The application 2070 (e.g., the application 1834) may include, for example, a preloaded application or a third party application. For example, the application 2070 may include a home application 2071, a dialer 2072, an SMS/MMS 2073, Instant Messaging (IM) 2074, a browser 2075, a camera 2076, an alarm 2077, a contacts manager 2078, a voice dialer 2079, an e-mail application 2080, a calendar application 2081, a media player 2082, an album application 2083, a clock 2084, etc.

At least a portion of the programming module 2000 may be implemented using instructions stored in computer-readable storage media. The instruction, when executed by at least one processor (e.g., the processor 1910), allows the at least one processor to perform a function corresponding to the instruction. The computer-readable storage medium may be, for example, the memory 1920. At least a portion of the programming module 2000 may be, for example, implemented (e.g., executed) by the processor 1910. At least a portion of the programming module 2000 may include, for example, a module, a program, a routine, sets of instructions or a process, etc. for performing one or more functions.

Names of elements of the programming module (e.g., the programming module 2000) according to embodiments of the present invention may change depending on a kind of an OS. Also, the programming module according to embodiments of the present invention may include at least one of the above-described elements, omit a portion of the elements, or further include additional another element.

As described above, related functions performed by various similar applications that process an image obtained by an image sensor are integrated in one camera application, so that a user is allowed to easily access another function such as light and shade, barcode or QR code recognition besides a shooting function.

An electronic device according to embodiments of the present invention may increase user convenience by defining a specific region of an image and a focus using a user gesture via a touchscreen during a preview state and providing a method of selecting a recognition module which will analyze image information of the specific region of the image.

Various embodiments of the present invention are applicable, not only to a barcode, a two-dimensional image code, face recognition, character recognition, but also to various fields such as person recognition or object recognition. For example, various embodiments of the present invention may provide a service such as character recognition or building recognition for a displayed image during a state of reproduction or pause, etc. of a video file as well as a preview of a camera image or a shot image.

Various embodiments of the present invention may provide convenience in selecting a desired code or text, and an image and provide information thereof, when various goods and goods' names or a barcode, a two-dimensional code, a text image, etc. regarding related information exist on printed media such as a magazine or a newspaper, etc.

In related methods, a specific recognition position such as a guide of a screen central portion is required, and causing difficulty in designating or selecting a specific image or a kind of a recognition module in the screen, and a method of driving two or more recognition modules alternately is used for some cases, so that an amount of operations may be large.

According to various embodiments of the present invention, since a type of a recognition module to drive is designated or limited according to a user gesture or a selection of a designated region related thereto and a pattern determination, a convenient and fast recognition method is provided.

Methods according to embodiments of the present invention may be implemented in the form of hardware, software, or a combination thereof.

For implementations using software, a computer-readable storage medium storing at least one program (i.e., software module) may be provided. At least one program stored in the computer-readable storage medium is configured for execution by at least one processor inside the electronic device. At least one program includes instructions allowing the electronic device to execute methods according to embodiments of the present invention.

A program in accordance with embodiments of the present invention (i.e., a software module or software) may be stored in a random access memory, a non-volatile memory including a flash memory, Read Only Memory (ROM), an Electrically Erasable Programmable Read Only Memory (EEPROM), a magnetic disc storage device, a Compact Disc ROM (CD-ROM), Digital Versatile Discs (DVDs), or other types of optical storage devices, or a magnetic cassette. Alternatively, this program may be stored in a memory configured using all or a portion of these mediums. A plurality of respective constituent memories may also be provided.

A program in accordance with embodiments of the present invention may be stored in an attachable storage device that may access the electronic device via a communication network such as the Internet, an Intranet, a Local Area Network (LAN), a Wide LAN (WLAN), or a Storage Area Network (SAN), or a communication network configured using a combination of these. This storage device may access the electronic device via an external port.

A separate storage device on a communication network may also access a portable electronic device.

Although the invention has been shown and described with reference to certain embodiments thereof, various changes in form and details may be made therein without departing from the spirit and scope of the invention as defined by the appended claims and their equivalents. Therefore, the scope of the present invention is not limited to the above-described embodiments, but is defined by the appended claims and any the equivalents thereof.

What is claimed is:

1. A method for recognizing a specific object inside an image in an electronic device, the method comprising:
    displaying an image comprising at least one object;
    detecting at least one gesture on the displayed image;
    designating, in response to the detected at least one gesture, an object region in the displayed image and determining a recognition function for recognizing the designated object region; and
    recognizing the designated object region using the determined recognition function.

2. The method of claim 1, wherein the recognition function includes at least one of character recognition, barcode recognition, face recognition, and two-dimensional image code recognition.

3. The method of claim 1, wherein determining the recognition function comprises:
    designating the object region in the image according to a first gesture; and
    selecting an object recognition module for analyzing the object region according to a second gesture.

4. The method of claim 3, wherein the object region is designated by a predetermined region determination reference based on position information of a location where the first gesture has been input or a pattern of the first gesture.

5. The method of claim 4, wherein the predetermined region determination reference includes at least one of a size of the object inside the image, a distance between an image-pick up device and the object, a position, pattern density, brightness, and a length of an edge.

6. The method of claim 3, wherein the second gesture is mapped to a specific object recognition module.

7. The method of claim 3, further comprising:
    performing focusing using the designated object region as a reference.

8. The method of claim 3, further comprising:
    adjusting at least one of brightness, sharpness, contrast, and an exposure time using the designated object region as a reference to enhance image quality.

9. The method of claim 3, further comprising:
    displaying a user interface informing that the object region has been designated; and
    tracking a position of the designated object region.

10. The method of claim 1, wherein determining the recognition function comprises:
    designating the object region in the image based on position information of a location where the detected at least one gesture has been input or a pattern of the detected gesture; and
    selecting an object recognition module for analyzing the designated object region.

11. The method of claim 10, wherein selecting the object recognition module for analyzing the designated object region comprises:
    analyzing a pattern of an object corresponding to a pattern path of the detected gesture on the designated object region; and
    selecting an object recognition module corresponding to the analyzed pattern.

12. The method of claim 10, wherein designating the object region comprises:
    analyzing a pattern of an object corresponding to a pattern path of the gesture on the designated object region; and
    inferring a direction, a slope, or a region of an object corresponding to the analyzed pattern.

13. The method of claim 10, wherein selecting the object recognition module for analyzing the designated object region comprises:
    selecting an object recognition module corresponding to a pattern of the gesture on the designated object region.

14. The method of claim 1, further comprising, before recognizing the designated object region:
    displaying a list of recognition functions for recognizing the designated object region; and
    selecting one function from the displayed list of recognition functions.

15. The method of claim 1, further comprising:
    displaying, after recognizing the designated object region, results of the recognition or a list of application related to the recognition results.

16. An electronic device comprising:
    at least one processor; and
    at least one memory,
    wherein the at least one memory comprises instructions that when executed, cause the at least one processor to:
    display an image comprising at least one object,
    detect at least one gesture on the displayed image,
    in response to the detected at least one gesture, designate an object region in the displayed image and determine a recognition function for recognized the designated object region, and
    recognize the selected designated object region using the determined recognition function.

17. The electronic device of claim 16, wherein the recognition function includes at least one of character recognition, barcode recognition, face recognition, and two-dimensional image code recognition.

18. The electronic device of claim 16, wherein the instruction configured to determine the recognition function related comprises:
    an instruction configured to designate the object region in the image according to a first gesture; and an instruction configured to select an object recognition module for analyzing the object region according to a second gesture.

19. The electronic device of claim 18, wherein the object region is designated by a predetermined region determination reference based on position information of a location where the first gesture has been input or a pattern of the first gesture.

20. The electronic device of claim 19, wherein the predetermined region determination reference includes at least one of a size of the object inside the image, a distance between an image-pick up device and the object, a position, pattern density, brightness, and a length of an edge.

21. The electronic device of claim 18, wherein the second gesture is mapped to a specific object recognition module.

22. The electronic device of claim 18, wherein the at least one memory further comprises an instruction configured to perform focusing using the designated object region as a reference.

23. The electronic device of claim 18, wherein the at least one memory further comprises an instruction configured to adjust at least one of brightness, sharpness, contrast, and an exposure time using the designated object region as a reference to enhance image quality.

24. The electronic device of claim 16, wherein the instruction configured to determine the recognition function comprises:
    an instruction configured to designate the object region in the image based on position information of a location where the detected gesture has been input or a pattern of the gesture; and
    an instruction configured to select an object recognition module for analyzing the designated object region.

25. The electronic device of claim 24, wherein the instruction configured to select the object recognition module for analyzing the designated object region includes:
    an instruction configured to select an object recognition module corresponding to a pattern of the detected gesture on the designated object region.

26. The electronic device of claim 16, wherein the at least one memory further comprises:
    an instruction configured to display, before recognizing the designated object region, a list of recognition functions related to for recognizing the designated object region; and
    an instruction configured to detect a selection of one function from the displayed list of recognition functions.

27. The electronic device of claim 16, wherein the processor further comprises:
    an instruction configured to display, after recognizing the selected designated object region, results of the recognition; or
    an instruction configured to display a list of at least one application related to the recognition results.

28. The electronic device of claim 27, wherein the instruction configured to display the list comprises an instruction configured to:
    generate the recognition results or the list to display in a virtual three-dimensional model,
    recognize camera pose information using a distribution shape of an object image,
    transform the three-dimensional model such that it is suitable for the camera pose information and a distribution shape of a code image, and
    display the model translucently or opaquely adjacent to or on the code image.

* * * * *